United States Patent [19]
Yokouchi et al.

[11] Patent Number: 5,936,926
[45] Date of Patent: Aug. 10, 1999

[54] VARIABLE TRANSFER RATE DATA REPRODUCTION APPARATUS

[75] Inventors: Kentaro Yokouchi; Shigeru Nemoto, both of Yokohama; Kazumi Iwata, Yokosuka, all of Japan

[73] Assignee: Victor Company of Japan, Ltd., Yokohama, Japan

[21] Appl. No.: 08/862,643

[22] Filed: May 23, 1997

Related U.S. Application Data

[62] Division of application No. 08/450,759, May 25, 1995, Pat. No. 5,671,204.

[30] Foreign Application Priority Data

May 25, 1994 [JP] Japan .................................. 6-135197
Jun. 15, 1994 [JP] Japan .................................. 6-156548
Jun. 15, 1994 [JP] Japan .................................. 6-158110

[51] Int. Cl.⁶ ........................................... G11B 5/76
[52] U.S. Cl. .............................. 369/60; 369/54
[58] Field of Search ............................ 369/32, 47, 48, 369/49, 50, 54, 58, 60

[56] References Cited

U.S. PATENT DOCUMENTS

| | | |
|---|---|---|
| 4,536,864 | 8/1985 | Van Rosmalen . |
| 4,985,784 | 1/1991 | Tsuboi et al. . |
| 5,430,703 | 7/1995 | Tsuji et al. . |
| 5,463,607 | 10/1995 | Roth et al. ........................ 369/60 |
| 5,491,677 | 2/1996 | Sasaki ............................... 369/60 X |
| 5,587,978 | 12/1996 | Endo et al. ....................... 369/60 X |
| 5,608,697 | 3/1997 | De Haan et al. ................. 369/60 X |

FOREIGN PATENT DOCUMENTS

| | | |
|---|---|---|
| 0522853 | 1/1993 | European Pat. Off. . |
| 0544504 | 6/1993 | European Pat. Off. . |
| 0550097 | 7/1993 | European Pat. Off. . |
| 4344932 | 6/1994 | Germany . |
| 1-223662 | 9/1989 | Japan . |
| 1-223663 | 9/1989 | Japan . |
| 1-223669 | 9/1989 | Japan . |
| 2-42685 | 2/1990 | Japan . |
| 3-57541 | 9/1991 | Japan . |
| 4-181547 | 6/1992 | Japan . |
| 4-186563 | 7/1992 | Japan . |
| 4-368670 | 12/1992 | Japan . |
| 5-161115 | 6/1993 | Japan . |
| 6-165125 | 6/1994 | Japan . |

*Primary Examiner*—Paul W. Huber
*Attorney, Agent, or Firm*—Lowe Hauptman Gopstein Gilman & Berner

[57] ABSTRACT

A variable transfer rate data reproduction system is provided which performs a reproduction operation and a reproduction inhibit operation cyclically to reproduce data recorded on a recording disc. A pickup traces a spiral track formed on the recording disc during the reproduction operation and is also controlled to continue to trace a following portion of the track over a plurality of track turns during the reproduction inhibit operation without a track jump. Upon resumption of the reproduction operation, the pickup jumps over the plurality of tracks to return back to a portion of the track where the reproduction operation has been Interrupted previously. This results in decreased mechanical stress acting on mechanical parts for moving the pickup.

8 Claims, 17 Drawing Sheets

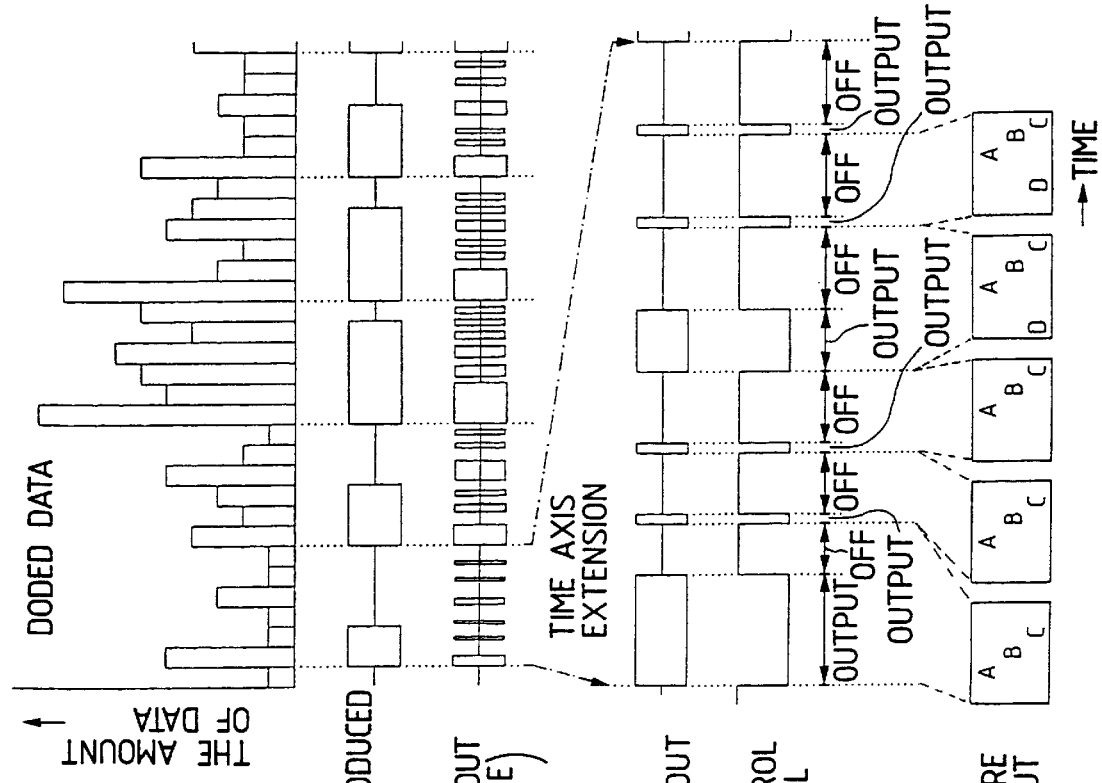

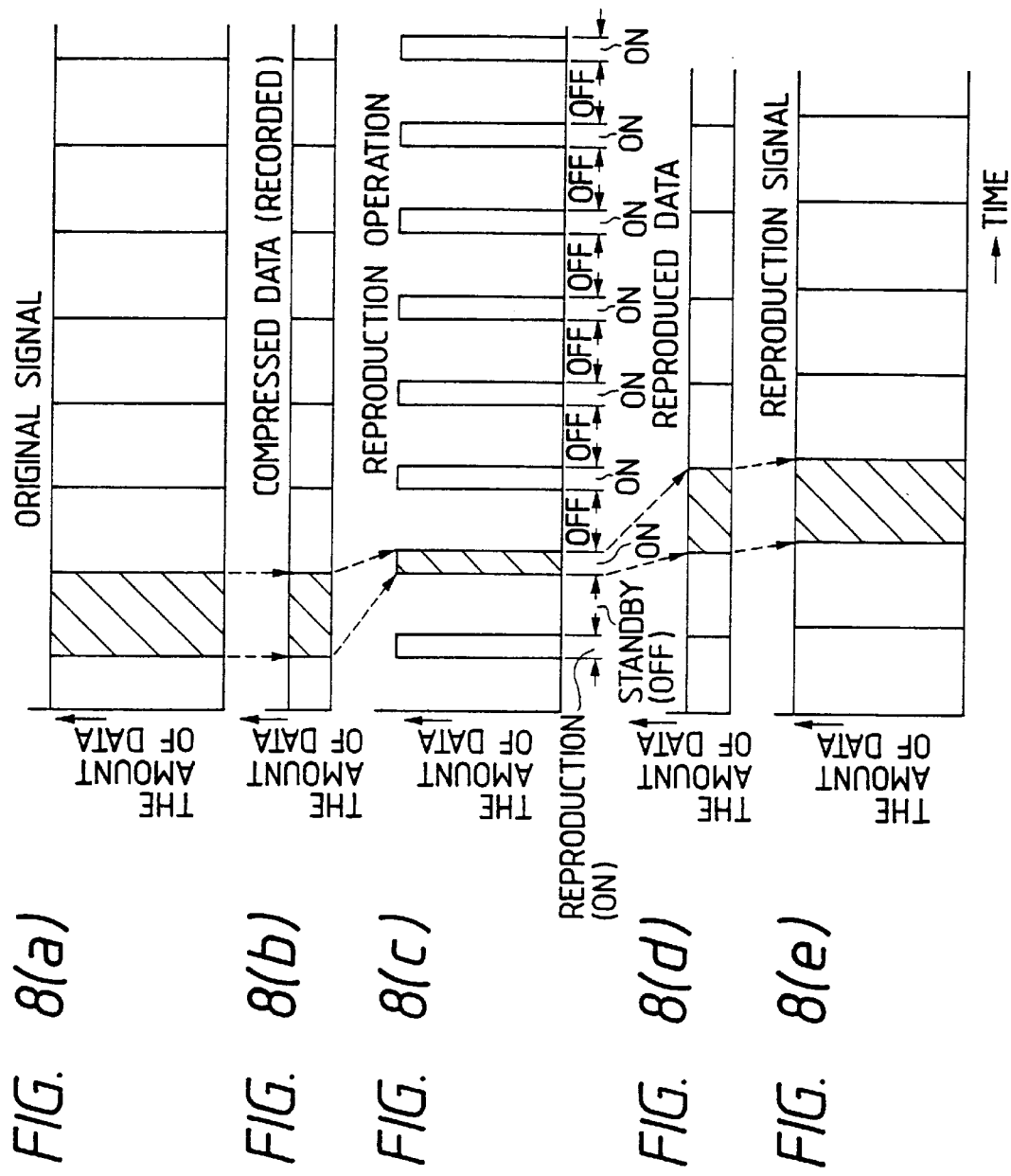

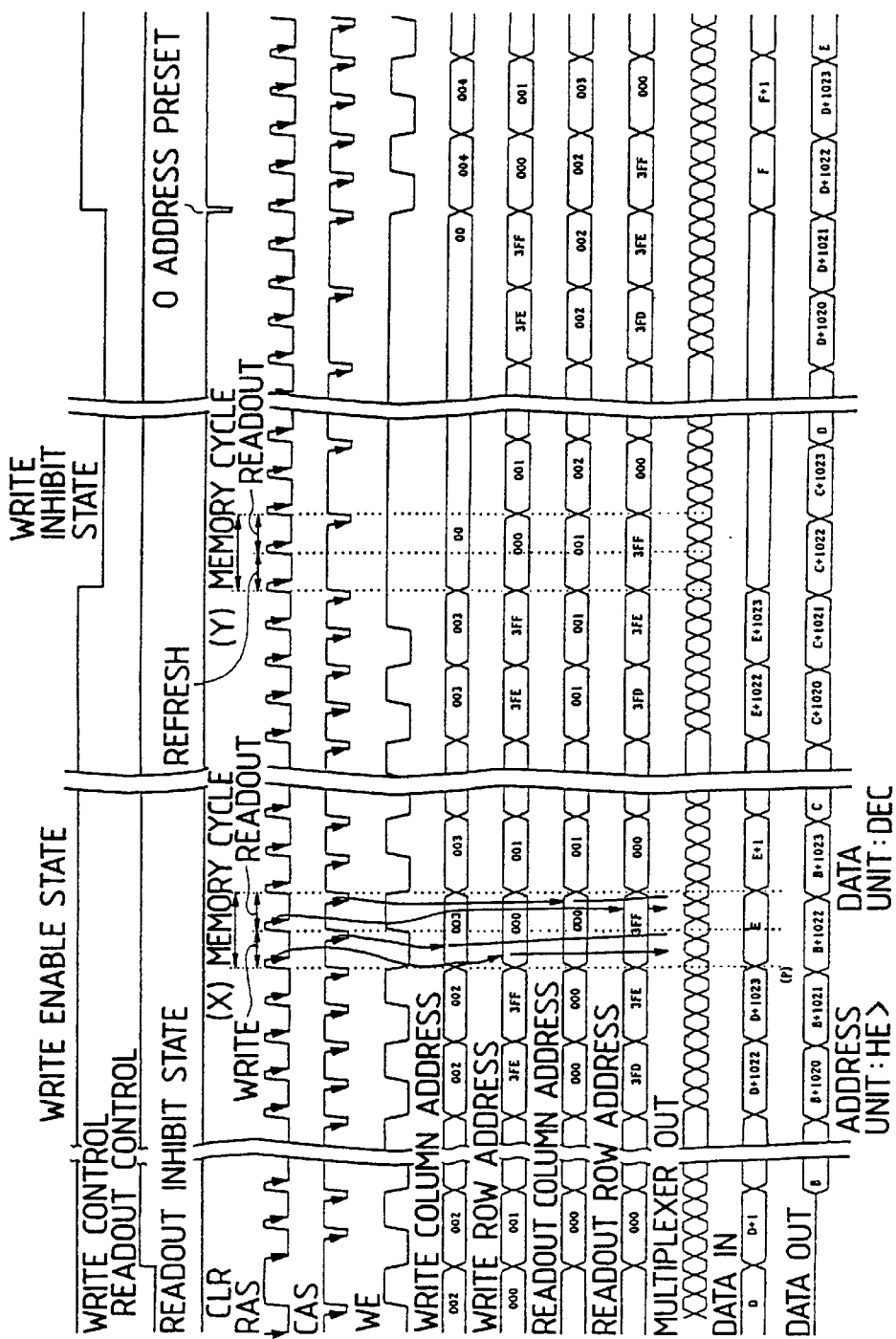

VARIABLE TRANSFER RATE DATA REPRODUCTION APPARATUS

This application is a division of application Ser. No. 08/450,759 filed May 25, 1995, now U.S. Pat. No. 5,671,204.

BACKGROUND OF THE INVENTION

1. Technical Field

The present invention relates generally to a data reproduction apparatus, and more particularly to a variable transfer rate data reproduction apparatus having an improved structure designed to read recorded data out of a recording medium which is recorded at a variable transfer rate.

2. Background Art

Various types of high-density recording/reproducing optical discs are known in the art. For example, a compact disc (CD) and a compact disc-interactive (CD-I) are known as a reproduction only optical disc. A magneto-optical disc and a mini disc (MD) are known as a writable optical disc.

The CD-I records therein information signals, which are compressed with ADPCM (Adaptive differential PCM), at a fixed transfer rate determined according to a sampling cycle. The MD records therein compressed information signals at a constant transfer rate.

The amount of data recorded on the CD-I or the MD processed per unit time during reproduction is usually constant. The data processing operation during such reproduction will be described below with reference to FIGS. 7 and 8(a) to 8(e). FIG. 7 shows an example of a conventional structure of a fixed transfer rate data reproduction system. FIGS. 8(a) to 8(e) show an operation of the reproduction system shown in FIG. 7.

The fixed transfer rate data reproduction system, as shown in FIG. 7, includes generally a signal reproduction unit 48, a data storage unit 49, a decoder 52, and a reproduction controller 51. The signal reproduction unit 48 is composed of an optical reproduction element such as an optical head and a signal processing circuit (not shown), and reproduces data recorded on a recording medium 1 such as an optical disc. The decoder 52 outputs a reproduced data signal through an output terminal 53.

An original signal to be recorded on the recording medium 1, as shown in FIG. 8(a), contains data of a constant amount along a time axis, which is, as shown in FIG. 8(b), compressed uniformly (by one-fourth in the shown example) to be recorded on the recording medium 1.

In operation, the optical disc 1 is first rotated at a given speed by a rotary mechanism (not shown). The optical head of the signal reproduction unit 48 then reproduces the recorded data on the optical disc 1 under control of a focusing control system and a tracking control system in the following manner.

The optical head emits a laser beam to a signal surface of the optical disc 1 to form an optical spot thereon. A photo-sensitive device (not shown) of the optical head receives a reflected beam from the optical disc 1, and converts it into an electric signal. The electric signal is then subjected to a given signal processing and outputted to the data storage unit 49 as reproduced data. The data storage unit 49 then stores therein the reproduced data.

If the compressed data, as shown in FIG. 8(b), recorded on the optical disc 1 is transferred, in sequence, directly from the signal reproduction unit 48 to the decoder 52, the reproduced data four times as much as the original signal per unit time, which is beyond a decoding capacity of the decoder 52, is transferred to the decoder 52.

Accordingly, the amount of the reproduced data within the decoding capacity is transferred to the decoder 52 in the following manner.

The signal reproduction unit 48 outputs the compressed data recorded on the optical disc 1 to the data storage unit 49 as the reproduced data at a maximum readout rate during a reproduction operation (labeled "REPRODUCTION" in FIG. 8(c)).

Alternatively, the signal reproduction unit 48 takes no action during a interval (labeled "STANDBY" in FIG. 8(c)) between the reproduction operations. Specifically, the signal reproduction unit 48 performs the reproduction operation cyclically under control of the reproduction controller 51, thereby allowing the reproduced data of an amount within the decoding capacity of the decoder 52 to be transferred to the decoder 52.

The cyclic reproduction operation of the signal reproduction unit 48 is accomplished in the following manner.

During the reproduction operation, the reproduced data outputted from the signal reproduction unit 48 is stored in the data storage unit 49. Conversely, during the standby operation, the reproduced data from the signal reproduction unit 48 is held from being stored in the data storage unit 49. At the same time, a track Jump is generated over one track every rotation of the optical disc 1, so that the optical head of the signal reproduction unit 48 traces the same track repeatedly.

The amount of data, as shown in FIG. 8(c), derived by reproducing the compressed data during the reproduction operation becomes equal to that of the reproduced data, as shown in FIG. 8(d), to be stored in the data storage unit 49.

The data storage unit 49 supplies to the decoder 52 the reproduced data of an amount, as shown in FIG. 8(d), required for the decoder 52 to provide reproduction signals, in sequence, to the output terminal 53.

As appreciated from the above, the fixed transfer rate data reproduction system shown in FIG. 7 reproduces data at a constant transfer rate, so that the amount of the reproduced data per unit time outputted from the signal reproduction unit 48 to the data storage unit 49 is equal to that of data per unit time which is supplied from the data storage unit 49 to the decoder 52. The amount of data is not changed partially during the reproduction operation so that the amount of the reproduced data per unit time transferred from the data storage unit 49 to the decoder 52 is maintained constant. Thus, the transfer of the data of an amount within the capacity of the decoder 52 reproduced by the signal reproduction unit 48 to the decoder 52 may easily be accomplished only by performing the reproduction operation and the standby operation alternately under the control of the reproduction controller 51.

In the above discussed fixed transfer rate data reproduction system, the amount of reproduced data per unit time is, as mentioned above, always constant. This means that the recorded data on the recording medium 1 is reproduced at a constant transfer rate regardless of the contents of information contained in the original signal. It is thus difficult to record and reproduce the original signal for a long period of time.

In order to overcome such a drawback, there has been proposed a high-efficiency coding system in accordance with variable transfer rate coding (i.e., a variable transfer rate coding system) for more efficient use of a limited recording capacity of a recording medium. In this coding system, a small number of codes per unit time are assigned to part of contents of information contained in the original signal which does not impinge upon decoding, while a great number of codes are assigned to part of the contents of information which impinges upon the decoding.

When recording data which is coded according to the above variable transfer rate coding is recorded on a recording medium at a preselected recording density, it is possible to record the recording data at twice a recording density at which the recording data is coded in accordance with the fixed transfer rate coding, however, the amount of reproduced data per unit time decoded in a decoder becomes equal to that of the coded data, as shown in FIG. 5(a), which is changed extremely.

The variable transfer rate coding system, similar to the data reproduction system shown in FIGS. 7, and 8, has the signal reproduction unit 48 and the data storage unit 49. The signal reproduction unit 48 performs a reproduction operation cyclically. The data storage unit 49 stores data reproduced by the signal reproduction unit 48 during the cyclic reproduction operation, and transfers a given amount of the reproduced data to the decoder 52 at regular intervals. When the amount of the reproduced data transferred to the decoder 52 is changed considerably, the decoder 52 may not decode consecutive original signals.

In order to avoid such a drawback, it may be proposed to constantly transfer a sufficient amount of reproduced data from the data storage unit 49 to the decoder 52 under control of a CPU incorporated in the reproduction controller 51. It is however difficult for the CPU to perform such control due to a lack of signal processing capacity.

In order to alleviate such a problem, it may also be useful to employ additional hardware and a CPU which is capable of controlling the data storage unit 49 so as to constantly supply a sufficient amount of reproduced data to the decoder 52 while performing normal reproduction control. These arrangements however increase the entire size of the system as well as its manufacturing costs.

The fixed transfer rate data reproduction system, as discussed above, generates a track jump over one track turn every rotation of the optical disc 1 during the standby operation. However, if a ratio of the amount of data read out of the optical disc 1 through the signal reproduction unit 48 to the amount of data processed by the decoder 52 is high, the length of time during which the standby operation is performed becomes greater than that during which the reproduction operation is performed, thus resulting in increased track jumps over one track turn, which will be described below with reference to FIG. 6(a).

The shown optical disc 1 has a spiral track. A thick line extending from a to b indicates a portion of the track from which recorded data is read out during the reproduction operation. A broken line extending from b to c indicates a portion of the track which an optical spot formed by the optical head traces during a subsequent standby operation.

During this standby operation, the optical spot traces the portion of the track indicated by the broken line from b to c (i.e., subsequent one track turn) repeatedly with track jumps or alternatively jumps from b to a to trace the portion indicated by the thick line repeatedly.

The track jump of the optical spot is achieved by supplying a kickback pulse to an actuator incorporated in a tracking control system of the signal reproduction unit 48.

Therefore, as discussed previously, when a compression ratio of the recorded data to the original signal is high and a ratio of the length of time of the standby operation to that of the reproduction operation is also high, the number of the kickback operations (i.e., the track jumps of the optical spot) of the actuator is increased. This results in increased mechanical stress acting-on a support structure and a drive coil of the actuator, thereby leading to a decreased lifetime of the system. Additionally, in the worst case, a circuitry around the tracking control system is broken, resulting in a malfunction of the actuator. Further, if the kickback pulse is applied to the actuator to move the optical head over a defect of the optical disc 1, a large track jump may occur.

When the standby operation is switched to the reproduction operation, it is necessary for the optical spot to be shifted toward a track turn which is to be reproduced subsequently. When a track Jump is generated during this period, the optical head needs to move over a plurality of track turns. This may require a long period of time for resuming the reproduction operation. In such a case, the need is arisen for providing a large storage capacity of a memory in the data storage unit 49.

Additionally, when the time required for resuming the reproduction operation is much longer than estimated, a sequence of reproduced data transferred from the data storage unit 49 to the decoder 52 may be broken, so that a reproduced signal is not outputted.

When the readout of reproduced data from the signal reproduction unit 48 is effected cyclically through the reproduction operation and the standby operation in the manner described above, it is effective to use a dynamic random-access memory (D-RAM) as a buffer memory in the data storage unit 49 for supplying a sufficient amount of data to the decoder 52.

As is well known in the art, it is commonly essential to refresh a D-RAM at given intervals by rewriting its entire contents. Thus, such a refreshing operation is needed in addition to the reproduction operation and the standby operation.

Thus, if the writing operation, the readout operation, the refreshing operation each require a period of time T. as shown in FIG. 11, three time periods 3T complete one memory cycle.

FIG. 12 shows circuit arrangements of a data storage unit 74 identical with the data storage unit 49.

The data storage unit 74 has disposed therein a D-RAM 61 which stores reproduced data inputted to an input terminal 75.

The reproduced data read out of the D-RAM 61 is decoded by a decoder 26 to provide a reproduction signal through an output terminal 78.

The reproduced data inputted to the input terminal 75 is data which has been read out of the optical disc 1 and subjected to a given signal processing through the signal reproduction unit 48.

The data storage unit 74 includes the D-RAM 61, a timing signal generator 79, a write address inhibiting circuit 80, a write address counter 81, a refreshing address counter 82, a readout address inhibiting circuit 83, a readout address counter 84, an address strobe pulse generator 85, a write enable signal generator 86, and an address multiplexer 70.

As long as the amount of reproduced data stored in the D-RAM 61 is held within a given storage range, the data storage unit 74 supplies the reproduced data to the decoder 26 and stores or writes therein the reproduced data inputted to the input terminal 75.

To an terminal 76, a clock signal is inputted from the signal reproduction unit 74. To a terminal 77, positional data (e.g., subcode data) of recorded data on the optical disc 1 which is to be reproduced therefrom is inputted from the signal reproduction unit 74.

When data reproduced from the optical disc 1 is written into and out of the D-RAM 61 and the D-RAM 61 is refreshed at the cycles shown in FIG. 11, address signals provided, respectively, by the write address counter 81, the readout address counter 84, and the refreshing address counter 82 are inputted to the D-RAM 61 through the address multiplexer 70 in accordance with time-division multiplexing. This allows the write operation, the readout operation, and the refresh operation of the D-RAM 61 to be performed.

The high-speed signal processing of data reproduced from the optical disc 1 in the signal reproduction unit 48 requires use of a high-speed D-RAM as the D-RAM 61. However, a desired high-speed D-RAM may be unavailable for a lack of operational speed or economical reasons.

Further, the data reproduction system designed to reproduce data formed by recording high-efficiency coded image data through a variable transfer rate system encounters the following drawbacks.

For example, reproduced data from the optical disc 1 may be stored once in the buffer memory of the data storage unit 49 at a first transfer rate and then outputted to the decoder 52 at a second transfer rate. Such techniques are taught, for example, in Japanese Patent First Publication No. 4-186563 as a digital data reproduction system.

This conventional digital data reproduction system is designed to set a rotational speed of a disc to a value suitable for a data transfer rate of an external device such as a computer for outputting data at a transfer rate required by audio or image data, and uses a random access memory as a buffer memory.

Moreover, Japanese Patent First Publication No. 4-181547 discloses a data reproduction system for a disc unit having disposed therein a storage device similar to the above mentioned buffer memory. This Publication also discloses a data reproduction system which brings a reproduction operation of a disc into an idling mode for a given period of time when a constant amount of data is stored in a storage device. The time required to compensate for a track shift is shortened by repeating the idling mode.

FIG. 18 shows an example of a conventional data reproduction system having a memory device like the one described above.

A recording medium or optical disc 100 is rotated by a spindle motor 120. Data recorded on the optical disc 100 is read out by an optical pickup (labeled "PU" in the drawing) and transferred as an analog reproduction signal S10 to a wave shaper 160.

The analog reproduction signal S10 is wave-shaped and binary-coded by the wave shaper 160 to provide binary-coded data S12 to a channel decoder 180 and a PLL circuit 200, respectively.

The PLL circuit 200 generates latch pulses S14 using the binary-coded data S12 from the wave shaper 160 to output them to the channel decoder 180 and a servo circuit 260.

The channel decoder 180 is responsive to the latch pulse S14 from the PLL circuit 200 to latch the binary-coded data S12 inputted from the wave shaper 160.

Subsequently, the channel decoder 180 detects synchronization of the latched binary-coded data S12, detects an error under CIRC (centralized Information Reference and Control), and corrects the error to provide data S16 to a buffer RAM 220.

The channel decoder 180 outputs subcode data S18 containing sector address extracted from the binary-coded data S12 to an access control unit 240.

The servo circuit 260 is responsive to the latch pulse S14 supplied from the PLL circuit 200 to control the speed of the spindle motor 120 to agree with a reference clock generated by a crystal oscillator (not shown) disposed in the channel decoder 180.

The servo circuit 260 is also responsive to an access control. signal S20 supplied from the access control unit 240 to operate tracking actuators (not shown) built in the optical pickup 140 and a sliding motor 280. With these arrangements, the optical pickup 140 is moved to a desired sector on the disc 100.

The buffer RAM 220 stores therein the data S16 from the channel decoder 180 according to a reproduction timing signal (not shown) outputted from the channel decoder 180. The data S16 stored in the buffer RAM 220 is read out according to a request signal S22 provided from an external signal processing unit 300 to a R/W cycle control unit 320, and then supplied to the external signal processing unit 300 as a readout data S24.

Writing and reading of data into and out of the buffer RAM 220 in the data reproduction system shown in FIG. 18 will be described below with reference to FIG. 19 which shows a data-storing process of the buffer RAM 220.

The R/W cycle control unit 320 monitors the amount of data stored in the buffer RAM 220 to control reading and writing of data out of and into the buffer RAM 220.

An address comparator 340 determines whether or not the amount of data stored in the buffer RAM 220 exceeds a minimum level (i.e., lower limit) shown in FIG. 19 or not. Note that the minimum level is fixed.

If the address comparator 340 has concluded that the amount of data stored in the buffer RAM 220 is decreased below the minimum level, it provides a readout inhibit signal S26 to the external signal processing unit 300, so that the request signal S22 is inhibited from being outputted.

An address comparator 360 determines whether or not the amount of data stored in the buffer RAM 220 exceeds a maximum level (i.e., upper limit) shown in FIG. 19. Note that the maximum level is fixed.

If the address comparator 360 has concluded that the amount of data stored in the buffer RAM 220 is increased above the maximum level, it provides a reproduction inhibit signal S28 to the access control unit 240 to store a sector address on the disc 100 during reproduction and to inhibit data on a subsequent sector from being reproduced.

Afterwards, the external signal processing unit 300 reads the data stored in the buffer RAM 220. When the amount of data stored in the buffer RAM 200 is decreased below the maximum level, the subsequent sector following the sector on which the data is stored and reproduced previously is accessed for resuming the reproduction of data.

When the amount of data stored is increased over the maximum level again, the reproduction of data is stopped, while when it is decreased below the maximum level again, the reproduction of data is resumed. In this manner, the data reproduction operation is, as can be seen from FIG. 19, performed cyclically.

Note that during a period of time until the amount of data stored in the buffer RAM 220 reaches the minimum level following initiation of a data storage operation, the data reproduction system continues to store data in the buffer RAM 220, while the external signal processing unit 300 is inhibited from reading the data out of the buffer RAM 220. Thus, the data is stored in the buffer RAM 220 at the same rate as a maximum reproduction transfer rate of the optical disc 100.

During a period of time until the amount of data stored in the buffer RAM 220 reaches the maximum level over the minimum level, both the writing data into and the reading data from the buffer RAM 220 are allowed. The data is stored in the buffer RAM 220 at a rate of a data writing rate minus a data reading rate.

Subsequently, when the amount of data stored in the buffer RAM 220 exceeds the maximum level, the data reproduction system is brought into a kickback state on standby, inhibiting the data from being stored in the buffer RAM 220.

When the amount of data stored in the buffer RAM 220 is decreased below the maximum level again, the optical pickup is shifted to search a subsequent sector on the disc 100 following a sector from which data is last read out.

In FIG. 19, search periods are indicated by broken lines. Upon access to a desired sector on the disc 100, data is read out therefrom and then written into the buffer RAM 220.

Once the amount of data stored in the buffer RAM 220 exceeds the maximum level after initiation of the data storage operation, it varies above and below the maximum level unless the data reproduction system is required to perform an access operation in response to a request signal inputted externally or a servo-malfunction occurs.

Specifically, the writing of data into the buffer RAM 220 is effected intermittently, so that three processes: the reading of data from one sector, the standby in the kickback operation, and the track search by movement of the optical pickup are performed in sequence. In other words, mechanical operations such as a track search and a track jump are required frequently, thereby causing mechanical parts to be degraded prematurely.

SUMMARY OF THE INVENTION

It is therefore a principal object of the present invention to avoid the disadvantages of the prior art.

According to one aspect of the present invention, there is provided a data reproduction apparatus which comprises (a) a data reproducing means for reproducing data, which is recorded on a recording medium at a variable transfer rate, at intermittent cycles and providing a signal indicative thereof, (b) a data storage means, responsive to the signal from the data reproducing means, for storing therein the data reproduced by the data reproducing means, (c) a decoding means for decoding the data reproduced by the data reproducing means to provide a reproduction signal in sequence, and (d) a reproduction controlling means for controlling operations of the data storage means and the decoding means, the reproduction controlling means transferring the reproduced data stored in the data storage means to the decoding means so as to allow the decoding means to provide the reproduction signal in sequence.

In the preferred mode of the invention, the reproduction controlling means controls a data reproduction operation of the data reproducing means so as to hold an amount of the reproduced data stored in the data storage means within a given range required for the decoding means to decode the reproduced data continuously.

The reproduction controlling means provides a decode inhibit signal to the decoding means to deactivate the decoding means until the amount of the reproduced data stored in the data storage means falls within the given range following initiation of an operation of the data reproduction apparatus.

The reproduction control means further provides a decode enable signal to the decoding means when the amount of the reproduced data stored in the data storage means is increased and falls within the given range following the initiation of the operation of the data reproduction apparatus. The decoding means is responsive to the decode enable signal to provide a data readout enable signal to the data storage means to read the reproduced data out of the data storage means for transferring the read reproduced data to the decoding means.

The reproduction control means selectively provides a reproduction enable signal and a reproduction inhibit signal to the data reproducing means according to the amount of the reproduced data stored in the data storage means to perform a data reproduction operation of the data reproducing means at the intermittent cycles. The data reproducing means has a reproduction element. The data reproducing means is responsive to the reproduction enable signal to have the reproduction element trace a data-recorded track provided on the recording medium to read recorded data therefrom and also responsive to the reproduction inhibit signal to stop the data reproduction operation thereof while allowing the reproduction element to trace a following portion of the data record track. When the reproduction control means provides the reproduction enable signal after providing the reproduction inhibit signal, the reproduction control means moves the reproduction element to a portion of the data-record track immediately before a portion where the data reproduction operation has been stopped in response to the reproduction inhibit signal.

An address generating means may further be provided for generating a write address signal containing an upper address and a lower address to provide the write address signal to a memory disposed within the data storage means. The data storage means controls writing of the reproduced data into the memory so that the amount of the reproduced data written into the memory contains two to the mth power ($2^m$) bits where m is defined to meet a relation of $n \leq m$ if the number of bits of the lower address of the write address signal is defined as n.

A data storage monitoring means may further be provided for monitoring the amount of the reproduced data stored in the memory installed in the data storage means to compare the monitored amount of the reproduced data with an upper storage level, a middle storage level, and a lower storage level and providing a signal indicative thereof. The reproduction controlling means is responsive to the signal from the data storage monitoring means to inhibit the reproduced data stored in the memory from being read therefrom when the amount of the reproduced data stored in the memory is lower than the lower storage level, to inhibit the data reproduced by the data reproducing means from being stored in the memory when the amount of the reproduced data stored in the memory exceeds the upper storage level, and to allow the data reproduced by the data reproducing means to be stored in the memory when the reproduced data stored in the memory is decreased below the middle storage level.

A middle storage level changing means may further be provided for changing the middle storage level. The middle storage level changing means detects a transfer rate of the reproduced data read out of the memory to change the middle storage level to a higher level when the transfer rate is greater than a given threshold value and to change the middle storage level to a lower level when the transfer rate is smaller than the given threshold value.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 5(a) to 5(f) are time charts which show a data stream during a reproduction operation;

FIGS. 8(a) to 8(e) are time charts which show a data stream during an operation of a data reproduction system;

FIGS. 10(a) to 10(l) are time charts which show an operation of a buffer memory of a data storage unit;

DESCRIPTION OF THE PREFERRED EMBODIMENT

Figure 1:
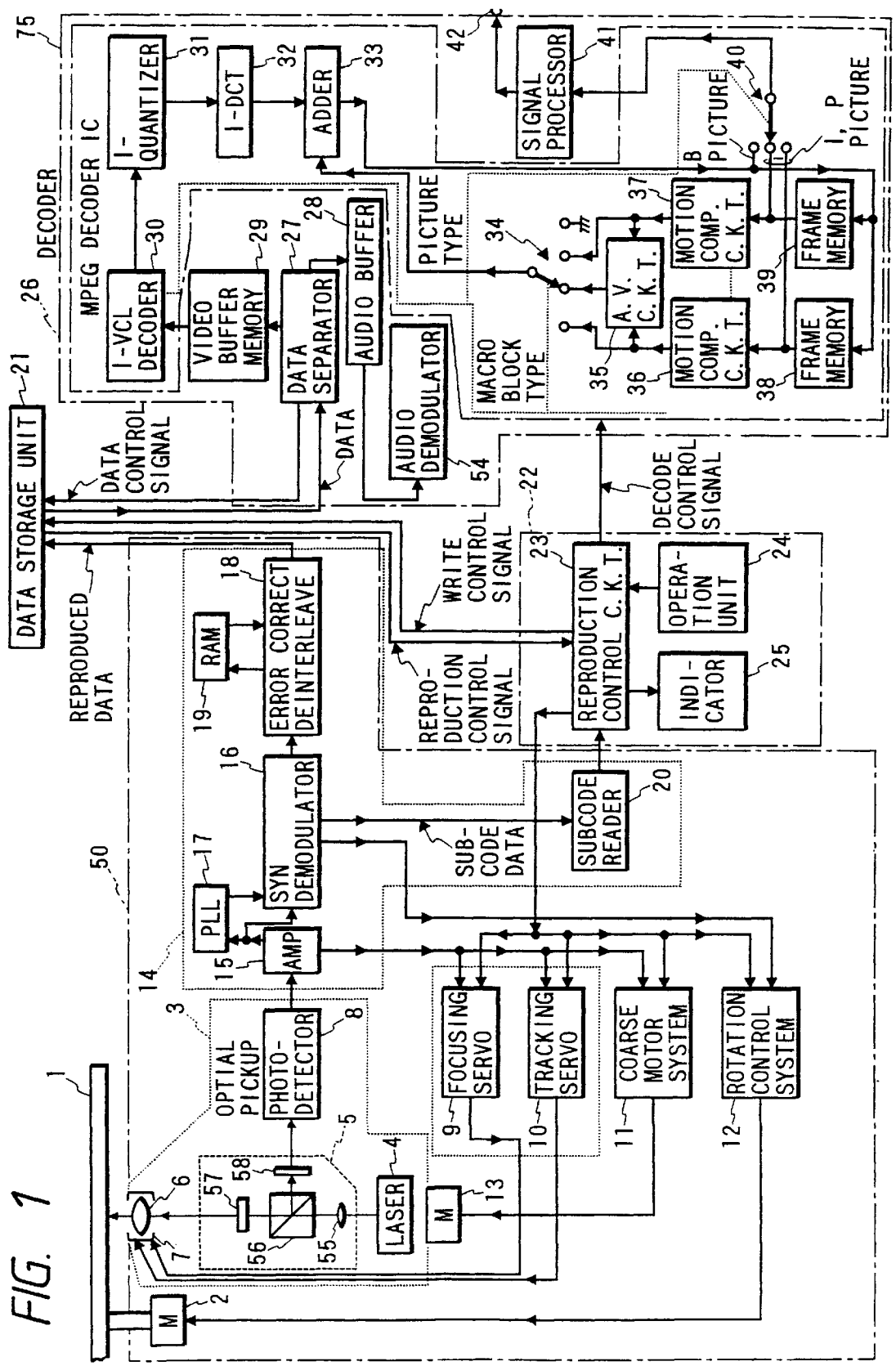
FIG. 1 is a block diagram which shows a variable transfer rate data reproduction system according to the present invention.

Referring now to the drawings, wherein like numbers refer to like parts in several views, particularly to FIG. 1, there is shown a data reproduction system according to the present invention.

The data reproduction system includes generally a signal reproduction unit 50, a data storage unit 21, a reproduction controller 22, and a decoder 26. A recording medium 1 is rotated by a drive motor 2 at a given speed and in a given phase under control of a rotation control system 12.

The recording medium 1 records thereon coded data (i.e., variable transfer rate data shown in FIG. 5(a)) which is coded through a high-efficiency coding system in accordance with variable transfer rate coding. The recording medium 1 may be provided with an optical disc, a magneto-optical disc, a magnetic disc, or any other similar recording medium. In FIG. 1, the recording medium 1 is an optical disc. Additionally, the coded data recorded on the recording medium 1 can be of audio data, image data, or computer program data.

The data reproduction system is designed to supply the variable transfer rate data reproduced or read out of the recording medium 1 by the signal reproduction unit 50 to the decoder 26 through the data storage unit 21 to decode it to provide a reproduction signal.

The amount of variable transfer rate data per unit time which is obtained by high-efficiency coding motion picture information, as shown in FIG. 5(a), varies considerably along a time axis. This variation occurs every image (frame), and also occurs every group of images.

In an example of FIG. 5(a), each group of images contains six images, as indicated between vertically extending broken lines. For an actual motion picture, one group of images in most cases contains fifteen to thirty frames.

Analyzing variable transfer rate data of an actual motion picture, it is found that there are variations in amount of data per image (for each shorter time period) and per group of images (for each longer time period).

The variation in amount of data per image represents a variation in amount of data per frame, for example. A coding system (MPEG system) in MPEG (Moving Picture Image Coding Experts Group) for motion picture information recorded on a recording medium in the form of digital data will be described below.

In the MPEG system, three units of images (frames) are defined in the following three image modes (1) to (3).

In the first image mode (1), a unit image (I-pictures (Intra Pictures) which will be referred to as an I-frame hereinafter) is defined in which image data is compressed using an in-frame predictive method.

In the second image mode (2), a unit image (P-pictures (Predicted Pictures) which will be referred to as a P-frame) is defined in which image data is compressed using an inter-frame predictive method based on image data of a previous frame.

In the third image mode (3), a unit image (B-pictures (Bi-directional Prediction Pictures) which will be referred to as a B-frame) is defined in which image data is compressed using an inter-frame predictive method based on both image data of a previous frame and image data of a subsequent frame.

In the MPEG system, a relation of a compression ratio among image data in the I-, P-, and B-frames is
(a compression ratio of image data in the I-frame)<(a compression ratio of image data in the P-frame)<(a compression ratio of image data in the B-frame)

Thus, it will be noted that the amount of data in the I-frame falls within a range from twice to ten times the amount of data in the P-frame or the B-frame. Additionally, the amount of data in each image group consisting of frames of one of the I-, P-, and B-frames or a combination of the I-, P-, and B-frames is great, especially when a scene change occurs or when a scene moves rapidly.

Since the amount of variable transfer rate data per unit time, as discussed previously, varies along a time axis, it is essential to reproduce data from the recording medium 1 so as to provide an amount of data enough to be decoded in the decoder 26. For this purpose, intermittent reproduction operations are performed while controlling a reproduction element 3 of the signal reproduction unit 50 to perform a seek operation. Specifically, the reproduction element 3 is controlled to trace a track continuously during a time period the reproduction operation is interrupted (i.e., a standby period) under control of a tracking servo system 10.

The resumption of the reproduction operation is accomplished by moving the reproduction element 3 to a location immediately before a location where the reproduction operation has been interrupted previously to reproduce recorded data from the recording medium 1.

Figure 2:
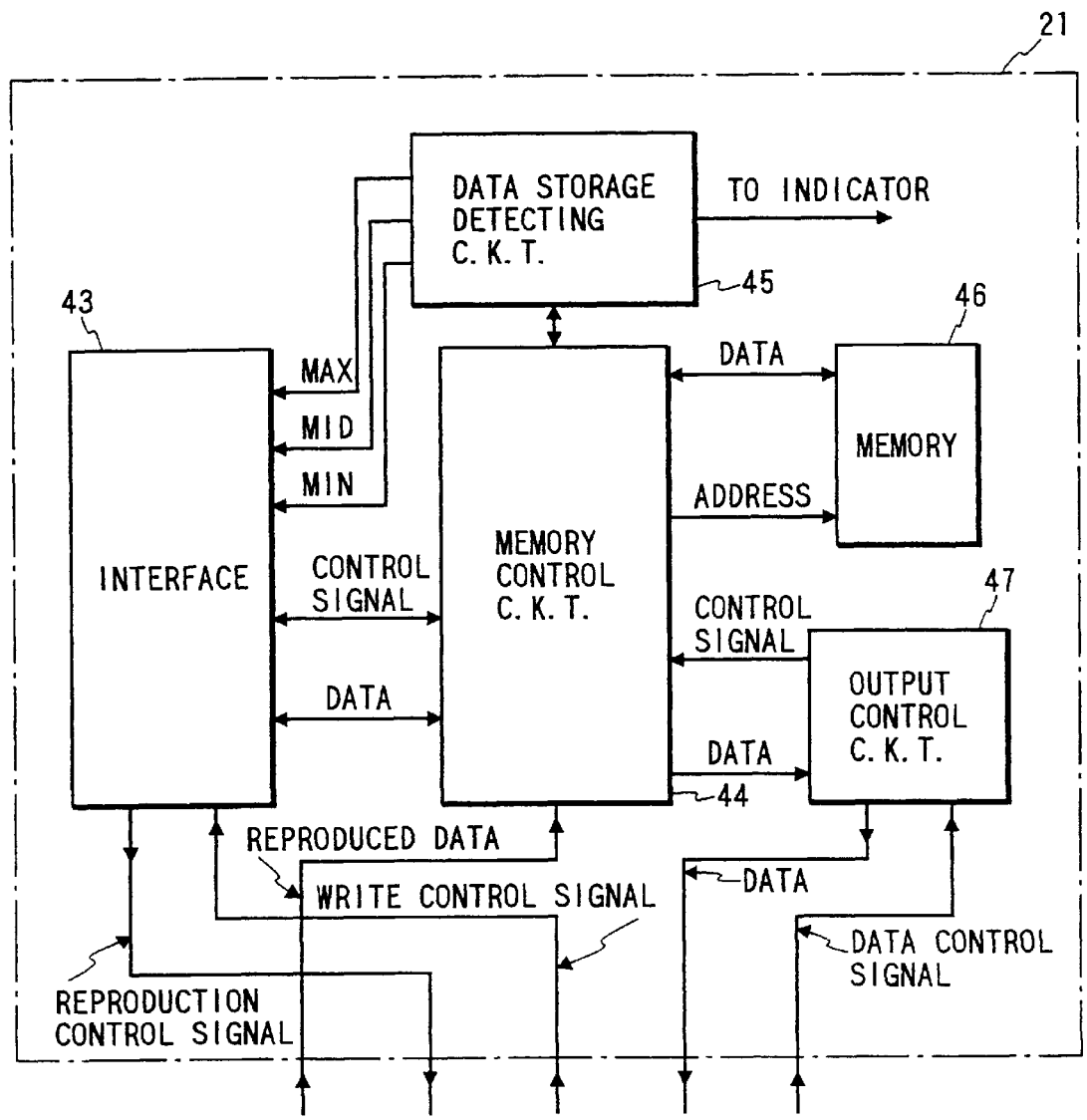
FIG. 2 is a block diagram which shows circuit arrangements of a data storage unit.

The recorded data reproduced from the recording medium 1 is subjected to a given reproduction process through a signal processing circuit 14 of the signal reproduction unit 50 and then stored in a memory 46, as shown in FIG. 2, of the data storage unit 21.

When a data control signal is provided from the decoder 26 to the data storage unit 21, the reproduced data stored in the memory 46 is read and then supplied to the decoder 26.

The amount of the reproduced data supplied to the decoder 26 is controlled by the data control signal from the decoder 26 to be sufficient for decoding of the decoder 26.

Specifically, the amount of the reproduced data stored in the memory 46 is regulated to be held from exceeding predetermined maximum and minimum limits greatly. For example, when the amount of the reproduced data stored in the memory 46 is decreased below the minimum limit, the data storage unit 21 provides a reproduction control signal to the reproduction controller 22. The reproduction controller 22 is responsive to the reproduction control signal to provide a control signal to the signal reproduction unit 50. The signal reproduction unit 50 then performs a reproduction operation with priority over a readout operation to read the reproduced data out of the memory 46.

The reproduction controller 22 controls an operation of the signal reproduction unit 50 so that the contents of recorded data read out from the recording medium 1 may be reproduced in the signal reproduction unit 50 in a correct sequence.

The reproduction controller 22 also controls a writing operation of the memory 46, and outputs a decode control signal to the decoder 26 to control a decoding operation thereof.

The reproduction element 3 of the signal reproduction unit 50 is formed with an optical pickup device which includes a laser source 4 (a semiconductor laser), an optical system 5, an objective lens 6, an actuator 7, and a photodetector 8. The optical system 5 includes a collimator lens 55, a polarization beam splitter 56, a ¼ wave plate 57, and a cylindrical lens 58.

A laser beam emitted from the laser source 4 is converted by the collimator lens 55 into a parallel beam to enter the objective lens 6 through the polarization beam splitter 56 and the ¼ wave plate 57 so that a micro-spot is formed on a signal surface of the optical disc 1.

A reflected beam from the signal surface of the optical disc 1 enters the polarization beam splitter 56 through the objective lens 6 and the ¼ wave plate 57, and then is reflected by the polarization beam splitter 56 to enter the photodetector 8 through the cylindrical lens 58.

Note that the photodetector 8 may be provided with a four-piece photodetector.

The photodetector 8 provides to an operational amplifier 15 an electric signal indicative of the recorded data on the optical disc 1, a focusing error, and a tracking error.

The operational amplifier 15 is responsive to the electric signal from the photodetector 8 to provide a signal indicative of the recorded data reproduced from the optical disc 1, a focusing error signal, and a tracking error signal. The signal indicative of the recorded data reproduced from the optical disc 1 is outputted to both a synchronous demodulator 16 and a phase-locked loop (PLL) 17 of a signal processing circuit 14.

The focusing error signal is supplied to the focusing servo system 9. Similarly, the tracking error signal is supplied to the tracking servo system 10 and a coarse motor control system 11.

The focusing servo system 9, the tracking servo system 10, the coarse motor control system 11, and the rotation control system 12 are supplied with control signals from a reproduction control circuit 23.

A coarse motor 13 is controlled by the coarse motor control system 11 to move the optical pickup 3 in a radial direction of the optical disc 1.

The objective lens 6 is moved by the actuator 7 in an axial direction thereof and in a radial direction of the optical disc 1.

Inputted to the actuator 7 are a focusing control signal from the focusing servo system 9 and a tracking control signal from the tracking servo system 10.

The optical pickup 3 is responsive to an output from the coarse motor control system 11 and the tracking control signal from the tracking servo system 10 to perform the seek operation as will be described below in detail.

The PLL 17 of the signal processing circuit 14 extracts a clock signal for data reproduction, and provides it to the synchronous demodulator 16.

The synchronous demodulator 16 detects a synchronizing signal from the clock signal supplied, and separates the reproduced data into subcode data and a maincode data based on the synchronizing signal.

The subcode data which contains reproduction positioning information on the optical disc 1 is supplied from the synchronous demodulator 16 to a subcode reader 20. The maincode data which is demodulated by the synchronous demodulator 16 Is supplied to an error correction deinterleave circuit 18. The maincode data is stored in a random access memory (RAM) 19 and then subjected to an known error correction through in the error correction deinterleave circuit 18 and the RAM 19. Then the error-corrected data is supplied to the data storage unit 21.

The reproduced data handled by the data reproduction system of the invention is not fixed transfer rate data, but variable transfer rate data. Thus, in order to supply to the decoder 26 the reproduced data of a sufficient amount for decoding of the decoder 26, it is necessary to adjust the amount of the reproduced data to an appropriate amount through several component parts of the data reproduction system. To this end, the reproduction controller 22, the signal reproduction unit 50, the data storage unit 21, and the decoder 26 are controlled in the following manner.

The reproduction controller 22 uses information indicative of an occupancy of the reproduced data in the memory 46 of the data storage unit 21 relative to a preselected reference amount of data to provide a control signal to the signal reproduction unit 50. The signal reproduction unit 50 is responsive to this control signal to perform the reproduction operation intermittently.

Figure 6A:
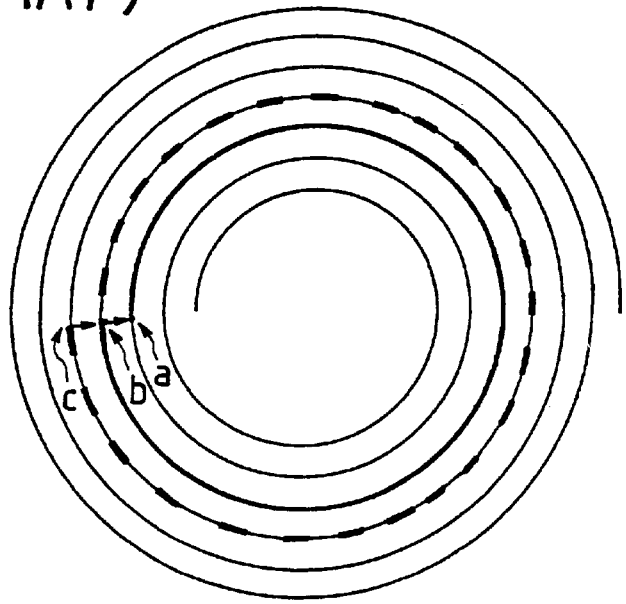
FIG. 6(a) shows a track jump of an optical pickup of a conventional data reproduction system.
Figure 6B:
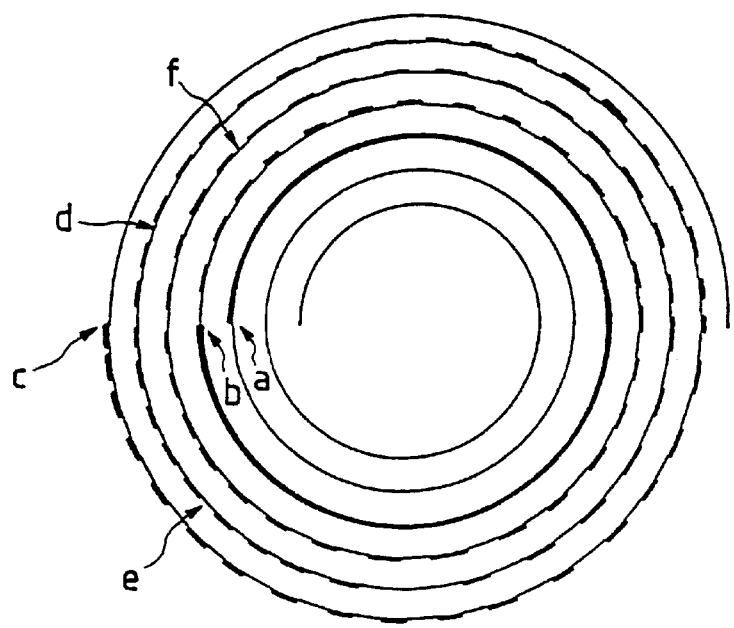
FIG. 6(b) shows a track jump of an optical pickup of a data reproduction system of the invention.

In practice, during a standby operation, the optical pickup 3 continuously traces a portion, as indicated by a broken line on a fine solid line in FIG. 6(b), of a spiral track. Upon resumption of the reproduction operation, the reproduction controller 22 provides control signals to the tracking servo system 10 and the coarse motor control system 11 to shift the optical pickup 3 back to a location immediately before a location where the reproduction operation has been interrupted previously. This seek operation of the optical pickup 3 is accomplished by using the subcode data as positioning information supplied from the subcode reader 20 to the reproduction control circuit 23.

As described above, the data reproduction system of the invention has the optical pickup 3 continue to trace the track, as shown in FIG. 6(b), under the tracking servo control without a track jump during the standby operation.

A thick solid line, as shown in FIG. 6(b), defined between a and b represents one track turn from which recorded data is reproduced during the reproduction operation. The broken line on the fine line represents track turns which the optical pickup 3 traces during the standby operation.

The characters c, d, e, and f each represent locations where the optical pickup 3 starts to perform the seek operation after the standby period has expired. Intervals between adjacent ones of these locations are dependent upon the length of the standby period.

The optical pickup 3, as mentioned above, traces the track on the optical disc 1 with high accuracy without effecting a track jump once during the standby operation. Upon resumption of the reproduction operation, the optical pickup 3 is controlled to move to a location immediately before a location where the reproduction operation has been interrupted. Such operations of the optical pickup 3 alleviate the problems, as mentioned in the introductory part of the specification, of the decrease in lifetime of the actuator for the optical pickup 3 and the malfunction of the tracking servo system 10.

Figure 7:
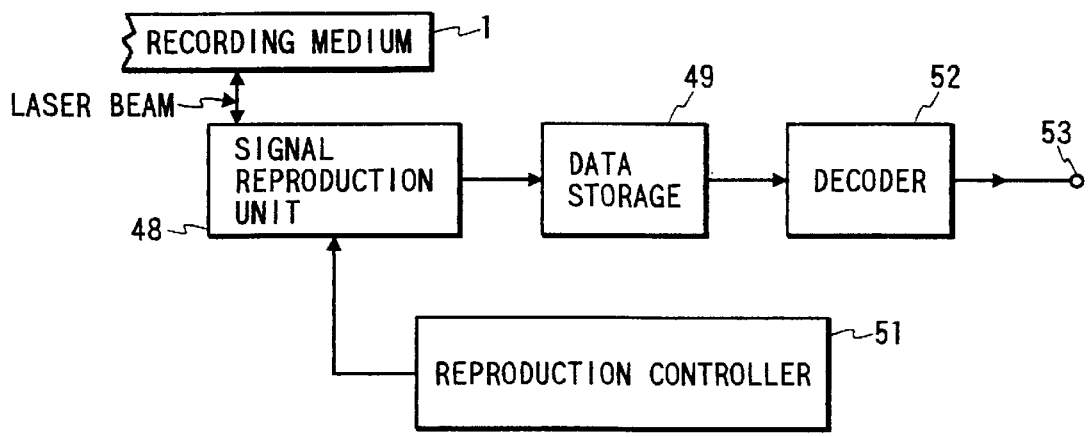
FIG. 7 is a circuit block diagram which shows a conventional fixed transfer rate data reproduction system.
Figure 11:
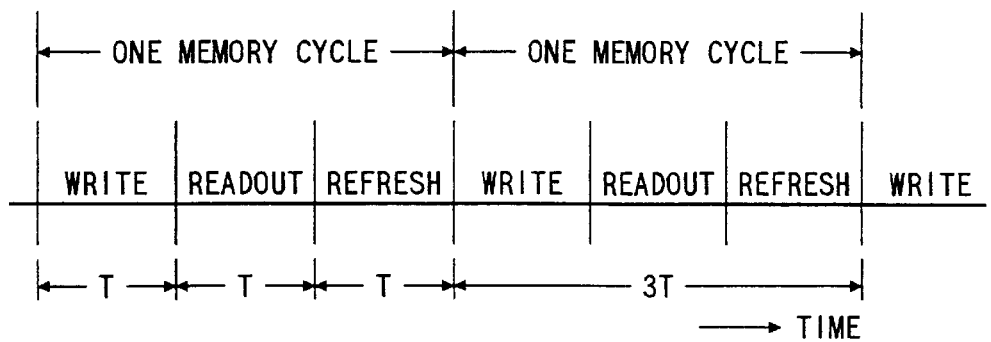
FIG. 11 is a time chart which shows a memory cycle of a buffer memory of a data storage unit.

In the data reproduction system of the invention, a displacement of the optical pickup 3 upon resumption of the reproduction operation is greater than that in the conventional data reproduction system, as shown in FIG. 7. This however does not increase the time until initiation of the reproduction operation for the following reasons.

In fact, the time required for the optical micro-spot to move over a plurality of track pitches is longer than that required for the optical micro-spot to move by one track pitch. There is however almost no difference in time required for specifying an address for securing a recorded data reproducing position on the optical disc upon resumption of the reproduction operation between the data reproduction system of the invention and the conventional system.

The reproduction control circuit 23 uses the subcode data supplied from the subcode reader 20 to provide a control signal as information for positioning the optical pickup 3 to the tracking servo system 10. The reproduction control circuit 23 may also uses the subcode data to indicate a reproduction time through a display unit 25.

The reproduction control circuit 23 may includes a microprocessor, a random access memory, and a read only memory.

To the reproduction control circuit 23, input information such as an operation mode and any other control information are given through a ten-key mounted on an operation unit 24.

The data storage unit 21, as shown in FIG. 2, includes an interface 43, a memory control circuit 44, a data storage detecting circuit 45, a memory 46, and an output control circuit 47.

When a data control signal is inputted to the output control circuit 47 from a data separator 27 of the decoder 26, the output control circuit 47 provides a control signal to the memory control circuit 44.

The memory control circuit 44 is responsive to the control signal from the output control circuit 47 to provide an address signal to the memory 46 to read reproduced data out of the memory The reproduced data thus read out of the memory 46 is transferred to the data separator 27 of the decoder 26 through the memory control circuit 44 and the output control circuit 47.

The amount of reproduced data stored in the memory 46 (hereinafter, referred to as a data storage) is decreased as the reproduced data is transferred to the decoder 26 according to the data control signal from the data separator 27.

Conversely, the data storage of the memory 46 is increased when reproduced data supplied to the memory control circuit 44 of the data storage unit 21 from the error deinterleave circuit 18 of the signal reproduction unit 50 is inputted to the memory 46 under control of the memory control circuit 44.

The data storage detecting circuit 45 monitors the data storage of the memory 46 to provide a signal indicative thereof to both the memory control circuit 44 and the interface 43.

The data storage (also referred to as an occupancy below) of the memory 46 may be determined based on, for example, an write address and a readout address of the memory 46.

Figure 4A:
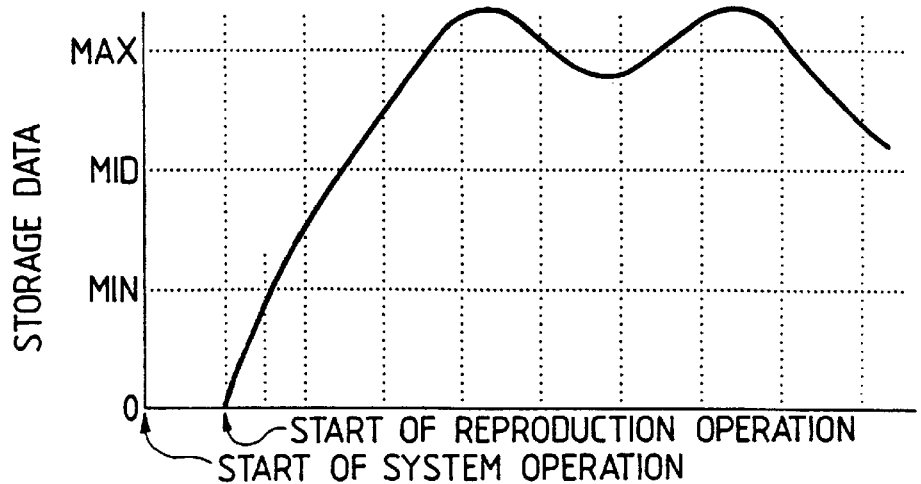
FIG. 4(a) is a graph which shows the amount of reproduced data stored on a data storage unit.

FIG. 4(a) shows a variation in the data storage in the memory 46. An ordinate axis indicates the data storage and an abscissa axis indicates the time. "Max" on the ordinate axis represents a maximum data storage level, "Min" represents a minimum data storage level, and "Mid" represents a middle data storage level between the maximum and minimum data storage levels.

Figure 4B:
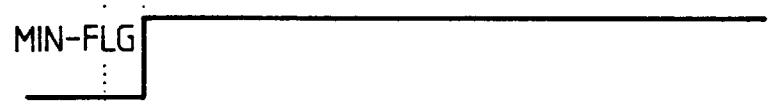
FIGS. 4(b) to 4(f) are time charts which show an operation of a variable transfer rate data reproduction system.
Figure 4C:
Figure 4D:
Figure 4E:
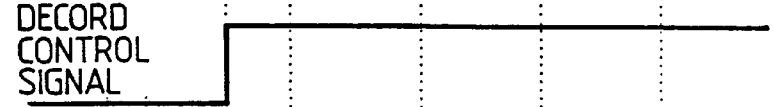

The data storage detecting circuit 45 provides to the interface 43 a Min-FLG signal, a Mid-FLG signal, and a Max-FLG signal, as shown in FIGS. 4(b) to 4(d), indicative of the minimum data storage level, the middle data storage level, and the maximum data storage level of the memory 46.

The data storage detecting circuit 45 may also provide data indicative of the data storage in the memory 46 to an indicator such as a liquid-crystal display or a numerical indicator formed with LEDs for visually indicating a storage condition of the memory 46.

The amount of data read by the optical pickup 3, as shown in FIG. 5(a), varies considerably with time, thereby causing the amount of reproduced data to vary with time, as shown in FIG. 5(b).

Hereinafter, the reproduction operation of the data reproduction system of the invention will be discussed.

Before the data reproduction system is activated in responsive to a reproduction start command inputted to the operation unit 24, the data storage of the memory 46, as can be seen from FIG. 4(a), is in an initial state, or zero.

Figure 4F:
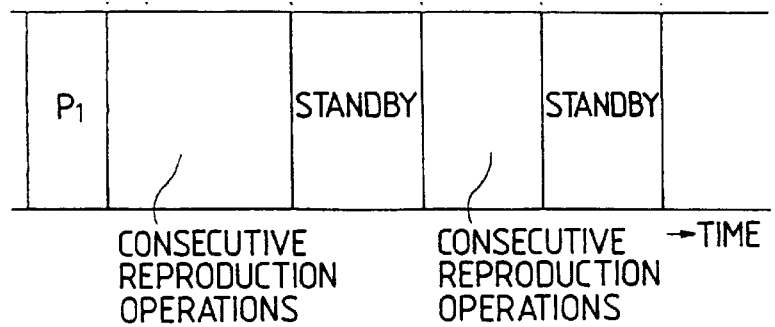

Additionally, before reproduced data read out from the optical disc 1 is stored in the memory 46 following the activation of the data reproduction system (i.e., during a period of time, as labeled "$P_1$" in FIG. 4(f)), the data storage of the memory 46 also shows zero. Thus, during the time period $P_1$ the Min-FLG, Mid-FLG, and Max-FLG signals outputted from the data storage detecting circuit 45 all indicate a low level.

When the data storage of the memory 46 is less than the minimum data storage level (Min), it is impossible to perform an decoding operation through the decoder 26.

The interface 43 thus provides the reproduction control signal to the reproduction controller 22 to output the decode control signal, as shown in FIG. 4(*e*), of low level to the decoder 26 for deactivating the decoding operation.

The reproduction controller 22 is also responsive to the reproduction control signal from the interface 43 to provide a control signal to the signal reproduction unit 50 for initiating the reproduction operation to read recorded data from the optical disc 1.

Upon the initiation of the reproduction operation of the signal reproduction unit 50 to supply the reproduced data to the data storage unit 50, the data storage of the memory 46 is increased gradually.

When the data storage of the memory 46 exceeds the minimum data storage level (Min), the data storage detecting circuit 45 switches the Min-FLG signal to a high level while maintaining the Mid-FLG signal and the Max-FLG signal at the low level.

Then the indicator 25 is responsive to the Min-FLG signal of the high level to visually indicate that the amount of the reproduced data stored in the memory 46 is greater than the minimum data storage level.

When the data storage of the memory 46 is at the minimum data storage level, it is impossible for the decoder 26 to perform the decoding operation continuously. It is thus necessary to have the reproduction controller 22 continue to output the decoding control signal outputted to the decoder 26 at low level to prohibit the decoding operation.

Additionally, as long as the data storage of the memory 46 is lower than the middle data storage level (Mid) if it exceeds the minimum data storage level, the reproduction controller 22 provides the control signal to the signal reproduction unit 50 based on the reproduction control signal outputted from the interface 43 to continue the reproduction operation with priority over the other control operations.

When the data storage of the memory 46 exceeds the middle data storage level, the data storage detecting circuit 45, as shown in FIG. 4(*c*), switches the Mid-FLG signal to the high level while maintaining the Min-FLG signal at the high level. The indicator 25 indicates that the amount of the reproduced data stored in the memory 46 is greater than the middle data storage level.

When the data storage of the memory 46 reaches the middle data storage level, it becomes possible to perform the decoding operation of the decoder 26. It is thus required to release the decoder 26 from the inhibition of the decoding operation.

Therefore, the interface 43 provides the reproduction control signal to the reproduction controller 22 to switch the decode control signal, as shown in FIG. 4(*e*), to high level from low level.

Additionally, the reproduction controller 22 is also responsive to the reproduction control signal to provide a control signal to the reproduction control unit 50 to release the reproduction operation having the priority over the other control operations to place the reproduction control unit 50 in a normal reproduction operation.

Upon input of the decode control signal of the high level from the reproduction controller 22 to the decoder 26, the data separator 27 provides the data control signal to the output control circuit 47 of the data storage unit 21.

The output control circuit 47 then outputs the control signal to the memory control circuit 44. The memory control circuit 44 supplies an address signal to the memory 46 to read out the reproduced data stored therein.

The reproduced data thus read out of the memory 46 is supplied through the memory control circuit 44 and the output control circuit 47 to the data separator 27 of the decoder 26, so that it is decoded sequentially.

The data separator 27 then determines whether the input reproduced data presents audio information or image information based on, for example, information indicated at a header of the input reproduced data.

In case of the audio information, the data separator 27 supplies the reproduced data to an audio buffer memory 28.

Alternatively, in case of the image information, the data separator 27 supplies the reproduced data to a video buffer memory 29.

The audio information stored in the audio buffer memory 28 is read out at a constant transfer rate and supplied to an audio demodulator 54 to output an audio reproduction signal.

The image information stored in the video buffer memory 29 is read so as to provide a data amount required for a decoding operation of a MPEG decode IC 75, and then supplied to an inverse VLC decoder 30.

The MPEG decode IC 75, as can be seen in FIG. 1, includes the inverse VLC decoder 30, an inverse quantizer 31, an inverse DCT device 32, an adder 33, switches 34, and 40, an averaging circuit 35, motion compensating circuits 36 and 37, and frame memories 38 and 39.

A reproduction signal provided by the MPEG decode IC 75 is subjected to a given signal-processing through a signal processing circuit 41 and then outputted from an output terminal 42. The MPEG decode IC 75 may be provided with a MPEG 2 decoder for ease of a decoding operation of variable transfer rate data.

The image information supplied to the inverse VLC decoder 30 is separated therein into various data. As one of these data, there is data indicative of a quantize discrete cosine transform parameter.

The quantize discrete cosine transform parameter data is inverse-quantized by the inverse quantizer 31, subjected to an inverse discrete cosine transformation through the inverse DCT device 32, and then supplied to the adder 33.

When the data subjected to the inverse discrete cosine transformation through the inverse DCT device 32 represents frame data of the I-pictures, it is stored directly in either of the frame memories 38 and 39. The two frame memories 38 and 39 engage alternately in a write operation and a readout operation frame by frame.

When the data outputted from the inverse DCT device 32 represents frame data of the P-pictures, it is added to a pixel value at a corresponding position (i.e., a position under motion compensation in each macroblock) in a picture of image data stored in one of the frame memories 38 and 39, and then stored In the other memory.

When the data outputted from the inverse DCT device 32 represents frame data of the B-pictures, it is added to a predicted pixel value motion-compensated using motion vectors prepared in the two frame memories 38 and 39, resulting in reproduced image data which is, in turn, outputted without being stored in the frame memories.

During processing of the frame data of the I- and P-pictures, the reproduced image data is outputted from one of the frame memories 38 and 39 into which the frame data is not being written.

The switch 34 is switched according to macroblock type information. The switch 40 is switched according to picture type information to selectively supply the reproduced data to the signal processing circuit 41.

The MPEG decode IC 75 reads the reproduced data of an amount required for decoding out of the video buffer memory 29, in sequence, along the time axis to decode it. Thus, the amount of reproduced data stored in the video buffer memory 29 is decreased gradually.

In order to establish a fine decoding operation of the decoder 26, it is necessary to constantly retain in the video buffer memory 29 the reproduced data of an amount required for the decoding operation of the decoder 26. Therefore, when the amount of the reproduced data stored in the video buffer memory 29 is decreased below a given level, the video buffer memory 29 provides the data control signal to the output control circuit 47 of the data storage unit 21 through the data separator 27. The output control circuit 47 then provides the control signal to the memory control circuit 44 based on the data control signal received. The memory control circuit 44 then outputs an address signal to the memory 46 to read out reproduced data needed for the decoding.

The reproduced data read out of the memory 46 is transferred to the data separator 27 of the decoder 26 through the memory control circuit 44 and the output control circuit 47, and then stored in the video buffer memory 29 as image information.

FIG. 5(e) shows the data control signal intermittently provided from the data separator 27 according to the decoding operation of the decoder 26.

During a period of time the data control signal shows low level, the reproduction data is read out of the memory 46. During a period of time the data control signal shows high level, the reproduction data is held from being read out of the memory 46.

FIG. 5(f) shows image outputs derived by the reproduced data read out from the memory 46. The characters "A", "B", "C", and "D" indicate an image which moves to the right with time.

The amount of data per unit time reproduced from the optical disc 1 through the pickup 3 is greater than that required for providing the reproduction signals per unit time through the decoder 26. For this reason, directly storing in the memory 46 the reproduced data transferred sequentially from the signal reproduction unit 50 to the memory control circuit 44 requires providing a large storage capacity enough to retain all data recorded on the optical disc 1 to the memory 46. In practice, however, it is difficult to realize such a large capacity memory.

In this embodiment, the above problem is, as already mentioned, overcome by performing the reproduction operation intermittently during a time when the reproduced data of an amount required for the decoding operation of the decoder 26 is constantly read out of the memory 46 to read the recorded data out of the optical disc 1 to store consecutive reproduced data, in sequence, in the memory 46 of the data storage unit 21 so that the data storage of the memory 46 cannot exceed greatly a range from the maximum data storage level to the minimum data storage level. This results in a small variation in the data storage of the memory 46 along the time axis, as shown in FIG. 4(a).

When the data storage of the memory 46 exceeds the maximum data storage level, the Max-FLG signal outputted from the data storage detecting circuit 45 is switched to low level, so that the Min-FLG signal, the Mid-FLG signal, and the Max-FLG signal are all at the high level. The indicator 25 indicates that the data storage of the memory 46 is greater than the maximum data storage level.

Additionally, the interface 43 outputs the reproduction control signal to the reproduction control circuit 23 to interrupt the reproduction operation of the optical pickup 3 to bring it into the standby state. Note that the relation between the data storage of the memory 46 and an operation condition of the data reproduction unit 50 can be seen from FIGS. 4(a) to 4(f).

When the data storage of the memory 46 exceeds the maximum data storage level to bring the optical pickup 3 into the standby state, the optical pickup 3 starts to trace a portion of the track, as indicated in FIG. 6(b) by the broken line on the fine solid line.

When the data storage of the memory 46 is decreased below the maximum data storage level, the data storage detecting circuit 45 switches the Max-FLG signal to the low level while maintaining the Min-FLG signal and the Mid-FLG signal to the high level. The interface 43 then provides the reproduction control signal to the reproduction control circuit 23. The reproduction control circuit 23 controls the signal reproduction unit 50 for resuming the reproduction operation with priority over the other control operations.

Upon the resumption of the reproduction operation, the tracking servo system 10 and/or the coarse drive motor control system 11 are controlled in response to, for example, a kick pulse or a kickback pulse to shift the optical pickup 3 on the optical disc 1 to read recorded data following the recorded data when the reproduction operation was interrupted previously.

Figure 3A:
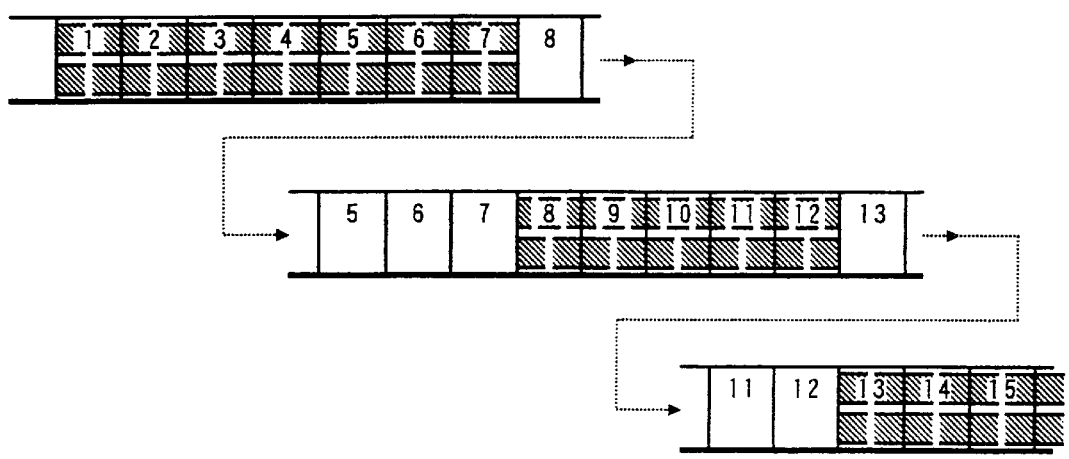
FIGS. 3(a) and 3(b) are explanatory views which shows a data stream formed by performing a reproduction operation and a reproduction inhibit operation cyclically.
Figure 3B:
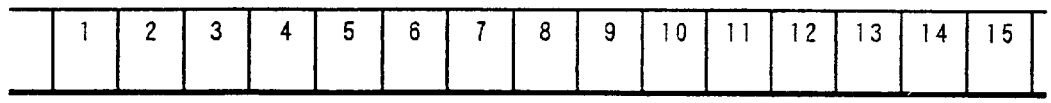

FIG. 3(a) shows a data stream reproduced by the optical pickup 3 following the resumption of the reproduction operation. FIG. 3(b) shows a sequence of data recorded on the optical disc 1.

Figure 9:
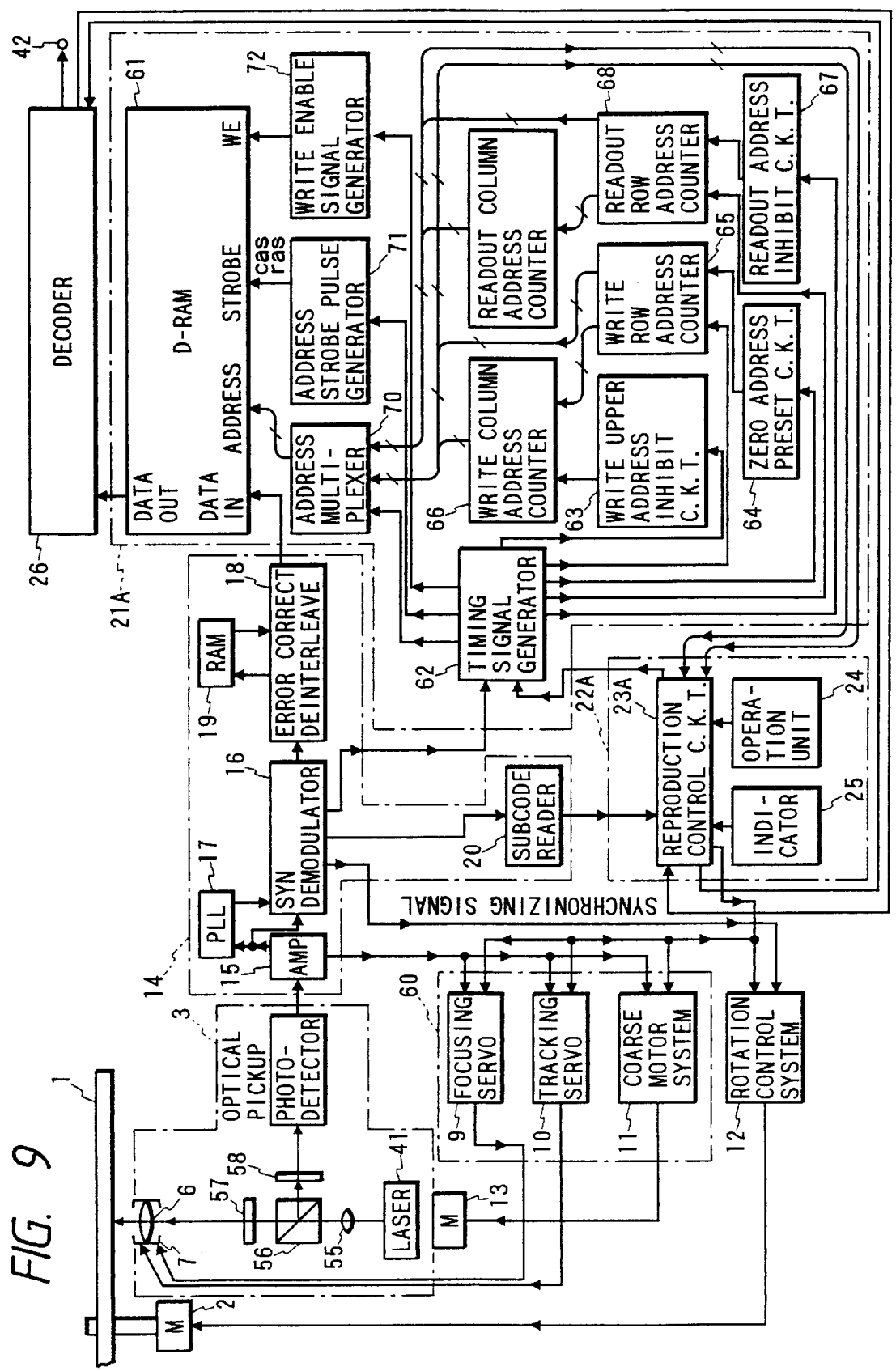
FIG. 9 is a block diagram which shows a variable transfer rate data reproduction system according to a second embodiment of the present invention.
Figure 12:
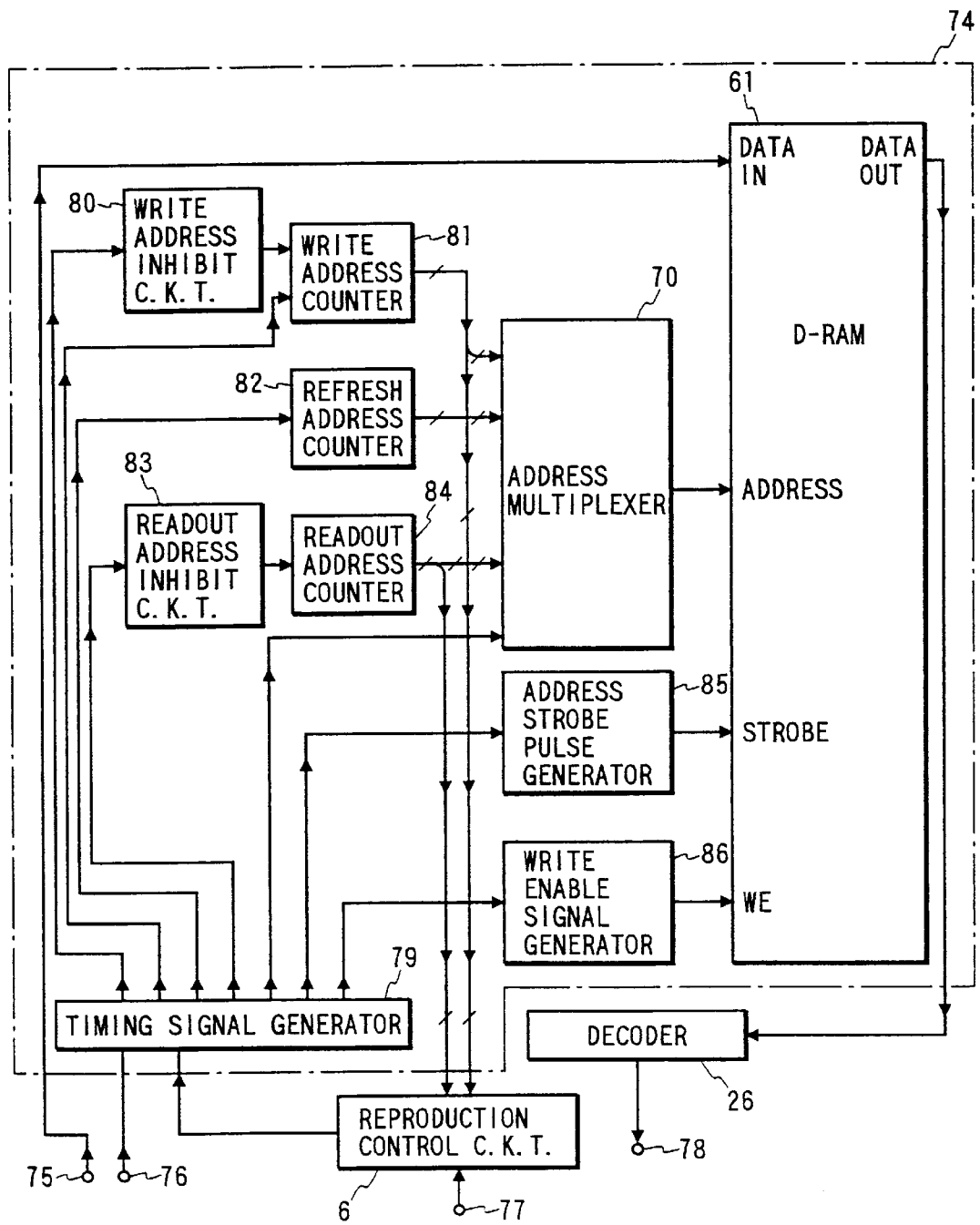
FIG. 12 is a circuit diagram which shows a buffer memory of a data storage unit.

Referring to FIG. 9, there is shown a second embodiment of the data reproduction system according to the invention.

The data reproduction system of this embodiment is different from the above first embodiment in that a data storage unit 21A is employed as a buffer memory instead of the data storage unit 21.

The data reproduction system includes a signal processing unit 14, the data storage unit 21A, a reproduction controller 22A, a decoder 26, and an optical pickup 60. The same reference numbers as employed in the first embodiment refer to the same parts and explanation thereof in detail will be omitted here.

The data read out of the optical disc 1 is transferred to the signal processing unit 14, so that it is subjected to a given reproduction processing and then stored in a dynamic-random access memory (D-RAM) 61.

The reproduced data stored in the D-RAM 61 is read out under operation control performed in the reproduction controller 22A, the data storage unit 21A, and the decoder 26 to be transferred to the decoder 26.

The amount of the reproduced data transferred to the decoder 26 is adjusted to be sufficient for a decoding operation executed by the decoder 26. Specifically, the amount of the reproduced data transferred to the decoder 26 is so controlled by a reproduction control circuit 23A as to be held from greatly exceeding a range from the minimum data storage level to the maximum data storage level.

When the data storage of the D-RAM 61 is decreased below the minimum data storage level, the reproduction operation of the optical pickup 3 is carried out with priority over a readout operation of the D-RAM 61.

Additionally, the reproduction controller 22A controls the optical pickup 3 to perform the reproduction operation intermittently so that the recorded data is read out of the optical disc 1 in sequence, and also provides a write enable signal to the D-RAM 61 through a write enable signal generator 72 to control a writing operation of the D-RAM 61.

The main data, which is demodulated by the synchronous demodulator 16 and supplied to the error correction deinterleave circuit 18, is stored in the RAM 19 and then transferred to the data storage unit 21A.

The reproduction controller 21A controls operations of the data storage unit 21A and the decoder 26 to maintain the amount of the reproduced data outputted from the signal processing unit 14 to be sufficient for the decoding of the decoder 26 in the following manner.

The reproduction controller 22A first calculates a difference between a write address and a readout address to derive an occupancy of the reproduced data in the D-RAM 61 to control the reproduction operation of the optical pickup 3 intermittently.

Specifically, the reproduction control circuit 23A uses subcode data supplied from the subcode reader 20 as positioning information on the optical pickup 3 to produce reproduction control signals to the tracking servo system 10 and the coarse drive motor control system 11 of the optical pickup control system 60 to selectively perform and interrupt the reproduction operation of the optical pickup 3.

Additionally, the reproduction controller 22A is responsive to a data readout command supplied from the decoder 26 to provide a control signal (a write control signal or a readout control signal) to a timing signal generator 62 of the data storage unit 21A according to the occupancy of the reproduced data in the D-RAM 61 for controlling the write operation and the readout operation of the D-RAM 61.

The timing signal generator 62 receives a clock signal supplied from the synchronous demodulator 16 to output timing signals in synchronism with reproduction of the data.

Before a reproduction command is inputted to the operation unit 24 to initiate the reproduction operation, the D-RAM 61 is empty.

If the reproduction command is inputted to the operation unit 24, the D-RAM 61 Is empty unless the reproduced data is inputted to the D-RAM 61.

When the data storage of the D-RAM 61 is below the minimum data storage level, it is impossible to perform the decoding operation through the decoder. The reproduction control circuit 23A thus provides a readout inhibit signal to the timing signal generator 62. The readout inhibit signal is also provided if a readout inhibit command is issued from the operation unit 24.

Upon input of the readout inhibit signal to the timing signal generator 62, the timing signal generator 62 provides a control signal to a readout address inhibiting circuit 67 to deactivate an counting operation of a readout row address counter 68.

The readout row address counter 68 serves to produce a lower address (i.e., a row address) of readout addresses. A write row address counter 65 serves to produce a lower address (i.e., a row address) of write addresses.

The timing signal generator 62 provides synchronizing signals to the readout row address counter 68 and the write row address counter 65.

When the data storage of the D-RAM 61 is less than the minimum data storage level, the reproduction control circuit 23A provides the control signal to the optical pickup 3 to initiate the reproduction operation with priority over the other control operation of the reproduction control unit 50.

Upon initiation of the reproduction operation to read out the recorded data from the optical disc 1 to supply it to the data storage unit 21A through the signal processing unit 14, the data storage of the D-RAM 61 is increased gradually from zero.

When the data storage of the D-RAM 61 reaches the minimum data storage level, the reproduction control circuit 23A provides a decode command signal to the decoder 26. The decoder 26, if placed in a reproduction allowable condition, provides a readout request signal to the reproduction control circuit 23A. The reproduction control circuit 23A then outputs the control signal to the timing signal generator 62 to initiate the readout operation to read the reproduced data from the D-RAM 61.

Upon supply of an address signal to the D-RAM 61 from an address multiplexer 70 for reading out the reproduced data to be decoded by the decoder 26, the reproduced data stored in the D-RAM 61 is transferred to the decoder 26. This causes the data storage of the D-RAM 61 to be decreased.

The amount of the reproduced data transferred to the decoder 26 from the D-RAM 61 is so adjusted as to provide reproduced signals, in sequence, through the decoder 26. This is accomplished by controlling the write operation and the readout operation of the D-RAM 61 to maintain the data storage thereof at a given level.

FIGS. 10(a) to 10(l) shows a write operation, a readout operation, and a refresh operation of the D-RAM 61.

During a period of time write control is, as shown in FIG. 10(a), in a write enable state (i.e., the write control signal outputted from the reproduction control signal 23A to the timing signal generator 62 is at a high level), the reproduced data is allowed to be written in the D-RAM 61. Alternatively, during a period of time the write control is in a write inhibit state (i.e., the write control signal is at a low level), the reproduction data is prohibited from being written in the D-RAM 61.

During a period of time readout control is, as shown in FIG. 10(b), in a readout enable state, the reproduced data stored in the D-RAM 61 is allowed to be read out therefrom. Alternatively, during a period of time the readout control is in a readout inhibit state, the reproduced data stored in the D-RAM 61 is inhibited from being read out therefrom.

A memory cycle, as labeled "(W)" in FIG. 10(d), established sequentially during a period of time the write operation and the readout operation of the D-RAM 61 are both permitted, contains the write operation and the readout operation.

A memory cycle, as labeled "(Y)" in FIG. 10(d), established sequentially during a period of time the write operation is inhibited and the readout operation is permitted, contains the refresh operation and the readout operation.

The address strobe pulse generator 71, as shown in FIG. 10(d), provides a pair of a row address strobe signal ras and a column address strobe signal cas to a strobe signal terminal of the D-RAM 61.

The write enable signal generator 72, as shown in FIG. 10(e), provides a write enable signal to a terminal We of the D-RAM 61. The write row address counter 65, as shown in FIG. 10(g), provides a write row address signal to the address multiplexer 40. The write column address counter 66, as shown in FIG. 10(f), provides a write column address signal to the address multiplexer 40.

The address multiplexer 40, as shown in FIG. 10(j), provides to the D-RAM 61 a write address signal which is time-division multiplexed using the write row address signal and the write column address signal.

The signal processing unit 14, as shown in FIG. 10(k), supplies the reproduced data to a data input terminal of the D-RAM 61.

When the write enable signal, as shown in FIG. 10(e), shows a low level, the row address strobe signal ras and the column address strobe signal cas, as shown in FIG. 10(d), are both outputted, and the time-division multiplexed write address signal, as shown in FIG. 10(f), are inputted to the D-RAM 61, the reproduced data, as shown in FIG. 10(k), is stored in a storage location addressed by the time-division multiplexed write address signal.

The readout row address counter 68, as shown in FIG. 10(i), provides a readout row address signal to the address multiplexer 40. The readout column address counter 69, as shown in FIG. 10(h), provides a readout column address signal to the address multiplexer 40.

The address multiplexer 40, as shown in FIG. 10(j), provides to the D-RAM 61 a readout address signal which is time-division multiplexed using the readout row address signal and the readout column address signal.

When the write enable signal, as shown in FIG. 10(e), shows a high level, the row address strobe signal ras and the column address strobe signal cas, as shown in FIG. 10(d), are both outputted, and the time-division multiplexed readout address signal, as shown in FIG. 10(j), are inputted to the D-RAM 61, the reproduced data, as shown in FIG. 10(l), stored in a storage location addressed by the time-division multiplexed readout address signal is read out from the D-RAM 61. The reproduced data read out from the D-RAM 61 is transferred to the decoder 26.

When the readout operation and the write operation of the D-RAM 61 are both allowed, the reproduced data transferred from the signal processing unit 14 is written into the D-RAM 61 while the reproduced data stored in the D-RAM 61 is read out therefrom.

The then amount of the reproduced data written into the D-RAM 61 is set to an amount of digital data containing $2^m$ bits where m satisfies the relation of $n \leq m$ if the number of bits of a lower address indicated by the write address signal formed with the write row address signal and the write column address signal is defined as n. This allows the write row address counter 65 to provide a carry signal to the write column address counter 66 when a period of time during which the reproduced data is permitted to be written into the D-RAM 61 has expired. Therefore, a count value of the write row address counter 65 shows zero at a time when the reproduced data is prohibited from being written into the D-RAM 61.

When the data storage of the D-RAM 61 is increased over the maximum data storage level, the reproduction control circuit 23A provides the control signal to the optical pickup system 60 to interrupt the reproduction operation of the optical pickup 3, and also provides the write inhibit signal to the timing signal generator 62. The timing signal generator 62 then supplies the timing signals to a write upper address inhibiting circuit 63, the write enable signal generator 72, the address strobe pulse generator 71, and the address multiplexer 70.

When the write upper address inhibiting circuit 63 is responsive to the timing signal from the timing signal generator 62 to provide the write inhibit signal to the write row address counter 66, a counting operation is stopped from the time when the reproduced data is inhibited from being written into the D-RAM 61. At the same time, the write enable signal generator 72 provides the write enable signal We of high level constantly to the D-RAM 61, and the address strobe pulse generator 71 prohibits a write row address probe from being provided to the D-RAM 61.

Thus, during the write inhibit period, the write enable signal We is maintained at the high level to hold the reproduced data supplied from the signal processing unit 14 from being written into the D-RAM 61.

The D-RAM 61 is therefore controlled at the memory cycle, as labeled "(Y)" in FIG. 10(d), containing the refresh operation and the readout operation so that it may be operated when a write row address strobe is provided while no write column address strobe is provided.

When the data storage of the D-RAM 61 is decreased below the maximum data storage level, the reproduction control circuit 23A provides the control signal to the optical pickup system 60 to resume the reproduction operation of the optical pickup 3, and also provides the write enable signal to the timing signal generator 62 of the data storage unit 21A for allowing the reproduced data to be written into the D-RAM 61. The timing signal generator 62 then provide the timing signals to the write upper address inhibiting circuit 63, a zero address preset circuit 64, the write enable signal generator 72, the address strobe pulse generator 71, and the address multiplexer 40.

When the timing signal is inputted to the write row address counter 66 from the timing signal generator 62 through the write address inhibiting circuit 63, the counting operation is started from the start of the write enable period. At the same time, the write enable signal generator 72 provides the write enable signal We of low level constantly to the D-RAM 61, and the address strobe pulse generator 71 produces the write row address probe to the D-RAM 61. The address multiplexer 70 is responsive to presetting of the zero address preset circuit 64 to provide the write row address signal, the write column address signal, and the time-division multiplexed readout address signal to the D-RAM 61 through the address terminal.

Thus, during the write inhibit period, the D-RAM 61 is controlled at the memory cycle, as labeled "(W)" in FIG. 10(d), containing the write operation and the readout operation.

The data write operation, the data readout operation, and the refresh operation of the D-RAM 61 are initiated when taking in the time-division multiplexed write address or readout address signals supplied from the address multiplexer 70 to the address terminal in response to input of the column address strobe signal cas and the row address strobe signal ras.

The data write operation, the data readout operation, and the refresh operation of the D-RAM 61 are performed in synchronism of a leading portion of the reproduced data with a leading portion of the memory cycle, as shown by vertical broken lines in FIG. 10(a) to 10(l).

The amount of the reproduced data intermittently stored in the D-RAM 61 may be adjusted to an amount of digital data containing $2^m$ bits where m satisfies the relation of $n \leq m < Q$ if a total number of addresses of the D-RAM 61 is defined as $2^Q$ and the number of bits of a lower address in a Q-bit address signal is defined as n. The continuity of addresses is maintained even in the intermittent write operations.

Additionally, the continuity of the reproduced data stored in the D-RAM 61 is also maintained desirably by making the write row address signal from the write row address counter 65 start with "0" when the write inhibit operation is switched to the write enable operation as well as setting the data storage to the $2^m$-bit data meeting the above described relation of $n \leq m < Q$.

Figure 13:
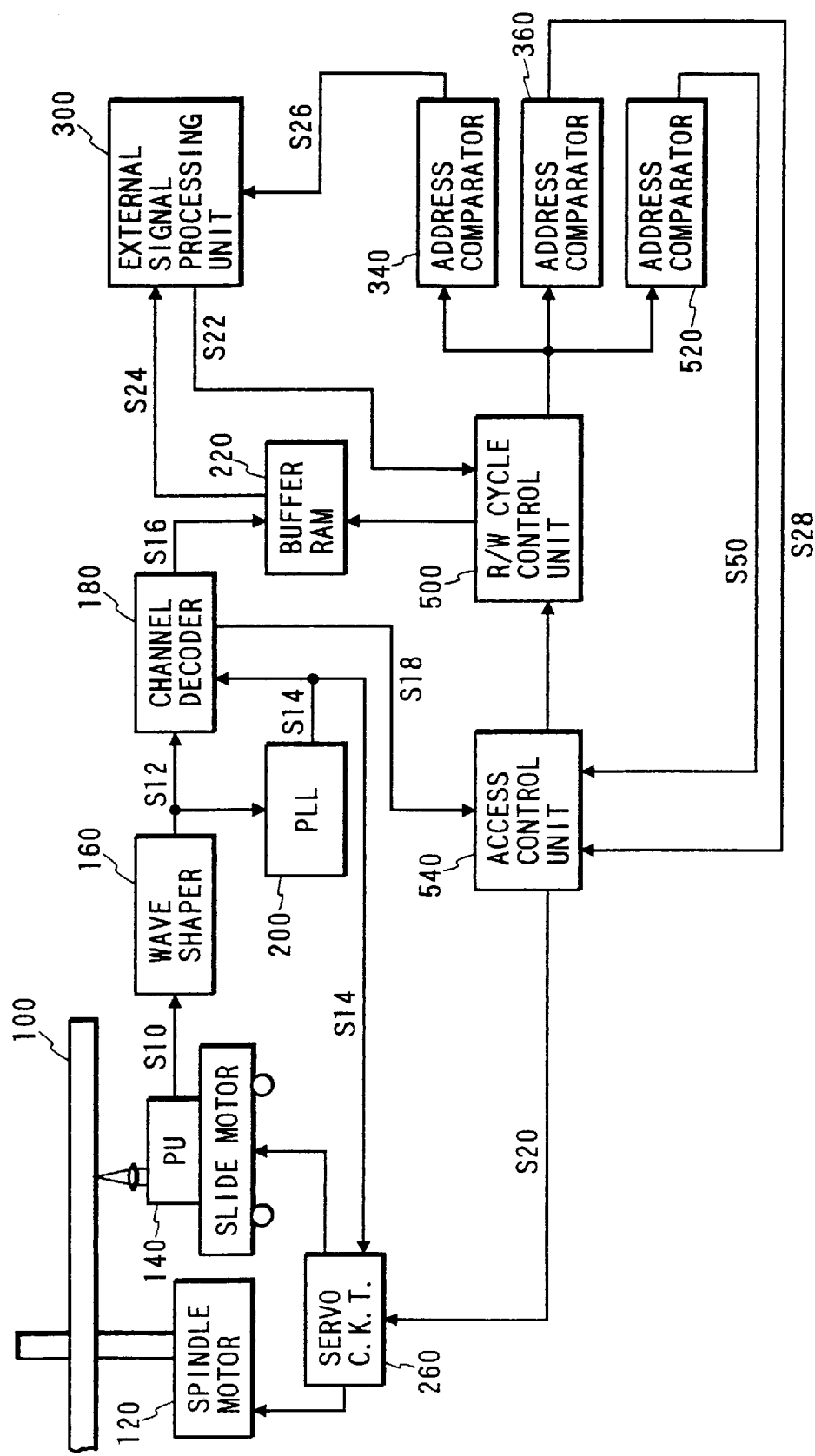
FIG. 13 is a block diagram which shows a variable transfer rate data reproduction system according to a third embodiment of the present invention.

Referring to FIG. 13, there is shown a third embodiment of the data reproduction system of the invention.

Figure 18:
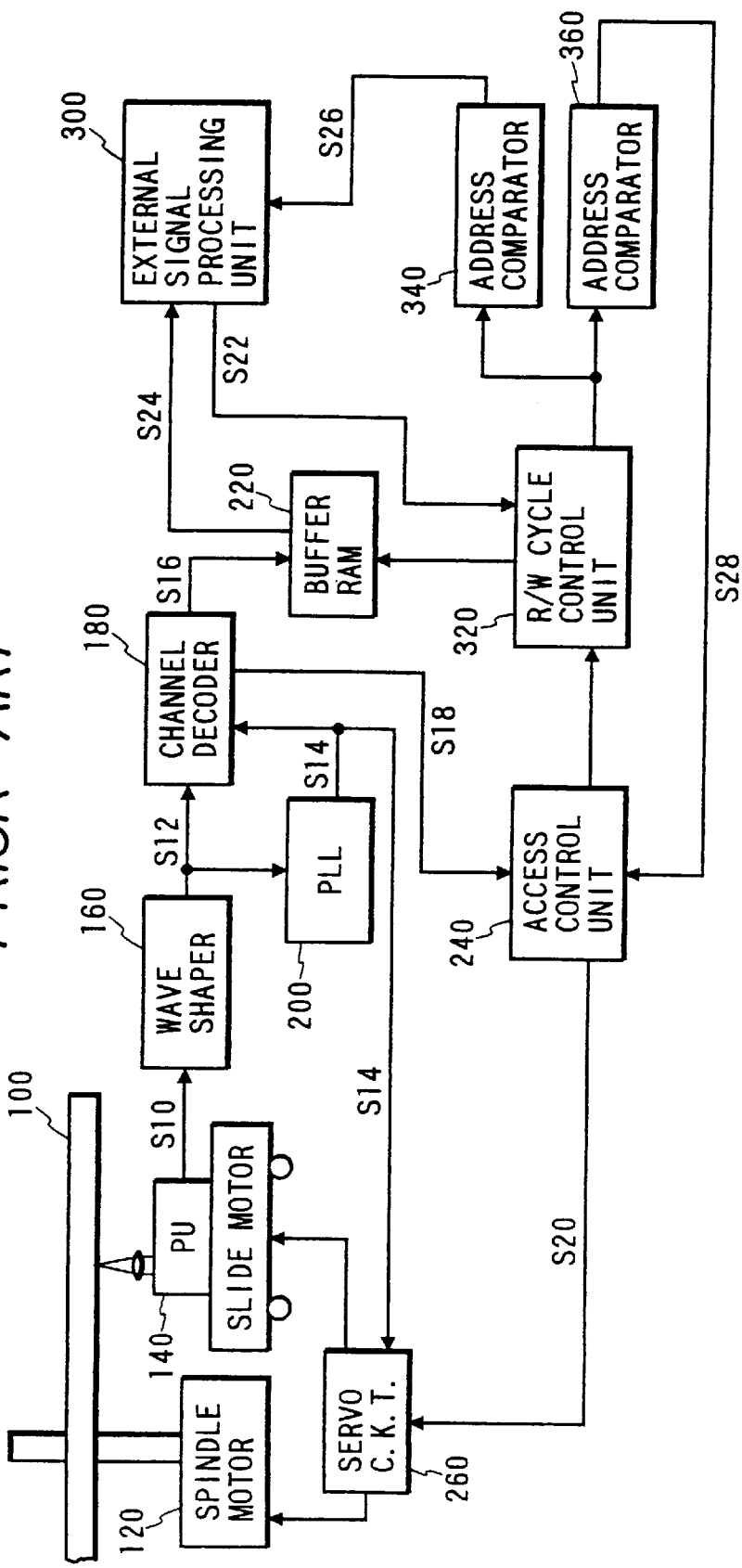
FIG. 18 is a block diagram which shows a conventional data reproduction system.

A W/R cycle control unit 500 monitors the data storage of a buffer RAM 220 to control data write and data readout operations of the buffer RAM 220. The W/R cycle control unit 500 is connected to address comparators 340, 360, and 520. An output terminal of the address comparator 520 is connected to an access control unit 540. Other arrangements are substantially the same as those of the conventional data reproduction system, as shown in FIG. 18, and explanation thereof in detail will be omitted here.

The address comparator 520 is operable to determine whether the data storage of the buffer RAM 220 is lower than the middle data storage level or not. If the data storage of the buffer RAM 220 is lower than the middle data storage level, then the address comparator 520 provides a reproduction start signal S50 to the access control unit 540.

The access control unit 540 is responsive to a reproduction inhibit signal S28 supplied from the address comparator 360 to interrupt the reproduction operation wherein recorded data is reproduced from the optical disc 100. Alternatively, when the reproduction start signal S50 is inputted from the address comparator 520, the access control unit 540 resumes the reproduction operation.

The time required from the interruption to the resumption of the reproduction operation corresponds to at least a complete rotation of the optical disc 100. Thus, the number of kick back operations of the optical pickup 140 can be decreased unless the reproduction operation is placed in the standby state beyond a time for the complete rotation of the optical disc 100. To this end, the middle data storage level is set to be lower than the maximum data storage level by a value corresponding to an amount of data reproduced during one track turn.

The reproduction inhibit signal S28 is provided, as similar to the conventional data reproduction system, when the data storage of the buffer RAM 220 exceeds the maximum data storage level.

However, the resumption of a data write operation for writing the reproduced data into the buffer RAM 220 upon initiation of a reproduction operation of the pickup 140 is established when the data storage of the buffer RAM 220 is decreased below the middle data storage level.

An operation of the data reproduction system of this embodiment will be described below.

The optical disc 100 is driven by the spindle motor 130 through the servo circuit 260 and reproduced by the pickup 140 in the same manner as that of the conventional data reproduction system discussed in the introductory part of this application.

Into the buffer RAM 220, the reproduced data S16 transferred from the channel decoder 180 is written. The reproduced dada stored in the buffer RAM 220 is read out therefrom according to a request signal S22 inputted from the external signal processing unit 300, and then supplied to the external signal processing unit 300 as readout data S24.

During readout of the reproduced data, the R/W cycle control unit 500 monitors a variation in the data storage of the buffer RAM 220 to control the data readout operation and the data write operation of the buffer RAM 220.

Figure 14:
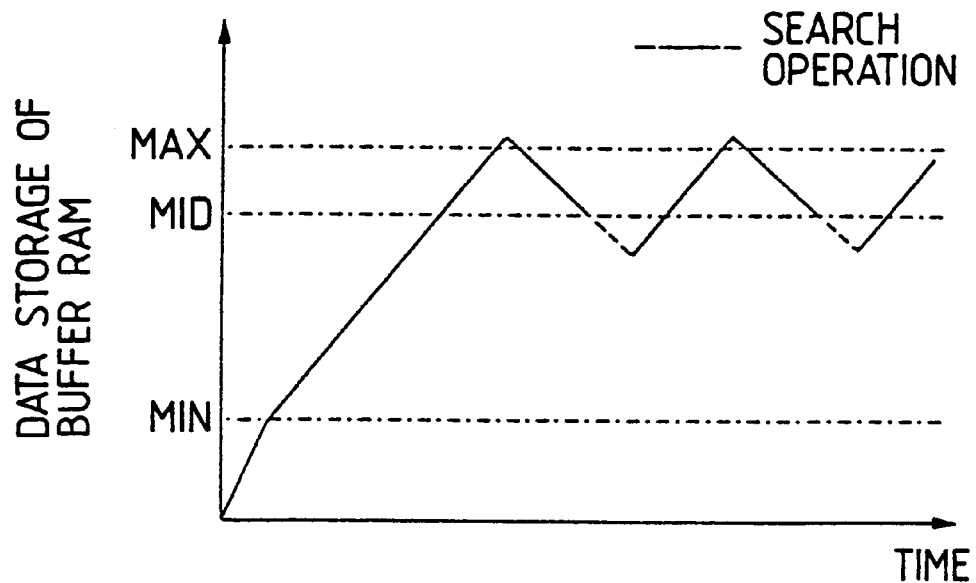
FIG. 14 is a graph which shows a variation in amount of data stored in a buffer RAM.

The address comparator 340 determines whether the data storage of the buffer RAM 220 exceeds the minimum data storage level, as shown in FIG. 14, or not. If it is concluded that the data storage is below the minimum data storage level, the address comparator 340 provides a readout inhibit signal S26 to the external signal processing unit 300. The external signal processing unit 300 then stops issuing the request signal S22.

The address comparator 360 determines whether the data storage of the buffer RAM 220 exceeds the maximum data storage level or not. If it is concluded that the data storage is increased over the maximum data storage level, the address comparator 360 outputs the reproduction inhibit signal S28 to the access control unit 540. The access control unit 540 stores therein an address of a sector of the optical disc 100 from which the recorded data is currently reproduced, and inhibits the recorded data from being reproduced from a following sector.

As the reproduced data stored in the buffer RAM 220 is read out by the external signal processing unit 330, the data storage of the buffer RAM 220 is, as shown in FIG. 14, decreased and lowered, in time, below the middle data storage level. The address comparator 520 then concludes that the data storage of the buffer RAM 220 is less than the middle data storage level, and provides the reproduction start signal S50 to the access control unit 540.

The access control unit 540 is responsive to the reproduction start signal S50 to initiate the data reproduction operation of the optical pickup 140. This causes the optical pickup 140 to be shifted to a sector on the optical disc 100 following the last reproduced sector to reproduce recorded data therefrom which is, in turn, stored in the buffer RAM 220.

On demand, the reproduced data stored in the buffer RAM 220 is read out and transferred to the external signal processing unit 300.

When the data storage of the buffer RAM 220 is increased over the maximum data storage level, the data reproduction operation is inhibited. Conversely, when the data storage of the buffer RAM 220 is decreased below the middle data storage level, the data reproduction operation is resumed.

Therefore, the data storage of the buffer RAM 220 varies, as shown in FIG. 14, over a range from the maximum data storage level to the middle data storage level at a cycle longer than that of the conventional data reproduction system. This means that the number of track jumps and track searches is less than that of the conventional data reproduction system, resulting in an increased lifetime of mechanical parts of the data reproduction system.

A fourth embodiment of the data reproduction system of the invention will be described below.

Figure 15B:
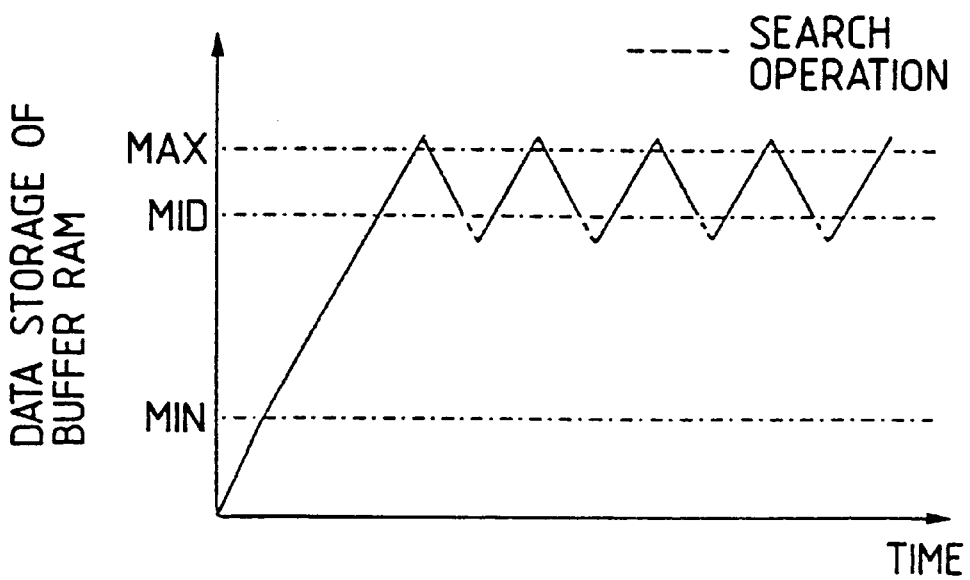
FIGS. 15(a) and 15(b) are graph which show cycles of variations in amount of data stored in a buffer RAM according to a data transfer rate.
Figure 15A:
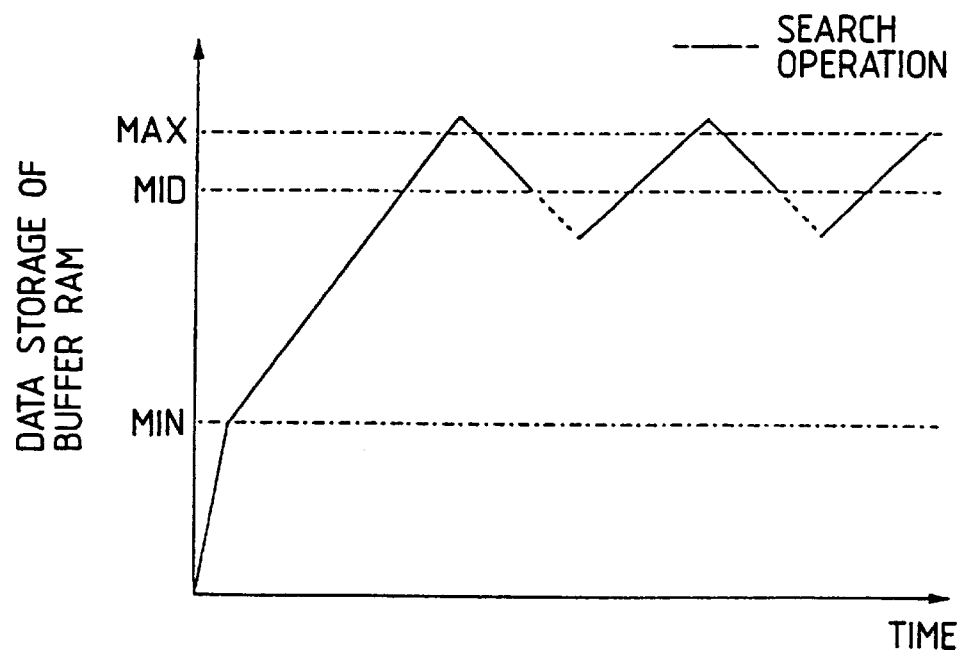
Figure 19:
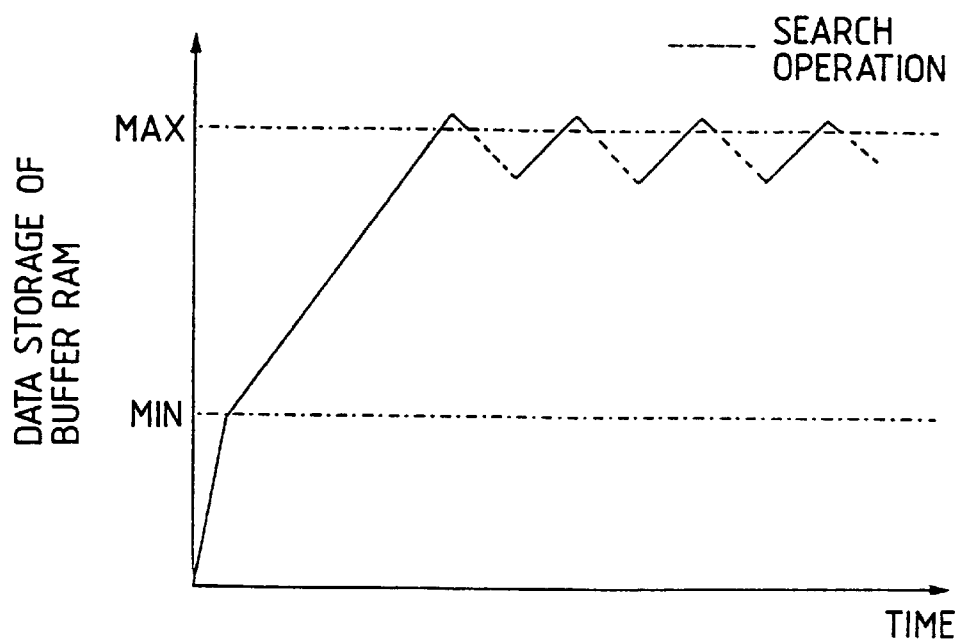
FIG. 19 is a graph which shows a variation in amount of data stored in a buffer RAM of a conventional variable transfer rate data reproduction system.

FIG. 14 shows that increasing a difference between the maximum data storage level and the middle data storage level causes a cycle of variation in the data storage of the buffer RAM 220 to be increased. Additionally, as the speed at which the reproduced data is read out from the buffer RAM 220 is decreased as compared with that of the data write operation, the cycle of the variation in the data storage, as shown in FIG. 15(b), is shortened. This means that as the difference between the maximum data storage level and the middle data storage level is increased, the number of track jumps and track searches which would impinge on the mechanical parts of the data reproduction system is decreased.

However, if the middle data storage level is set to a fixed level (referred to as a D-level below) which is greatly lowered from the maximum data storage level, it will cause the data storage of the buffer RAM 220 to drop instantaneously. This requires a trial against a failure in a seek operation of the optical pickup or in a data readout operation, and causes a margin for an external shock to be undesirably decreased.

Figure 16A:
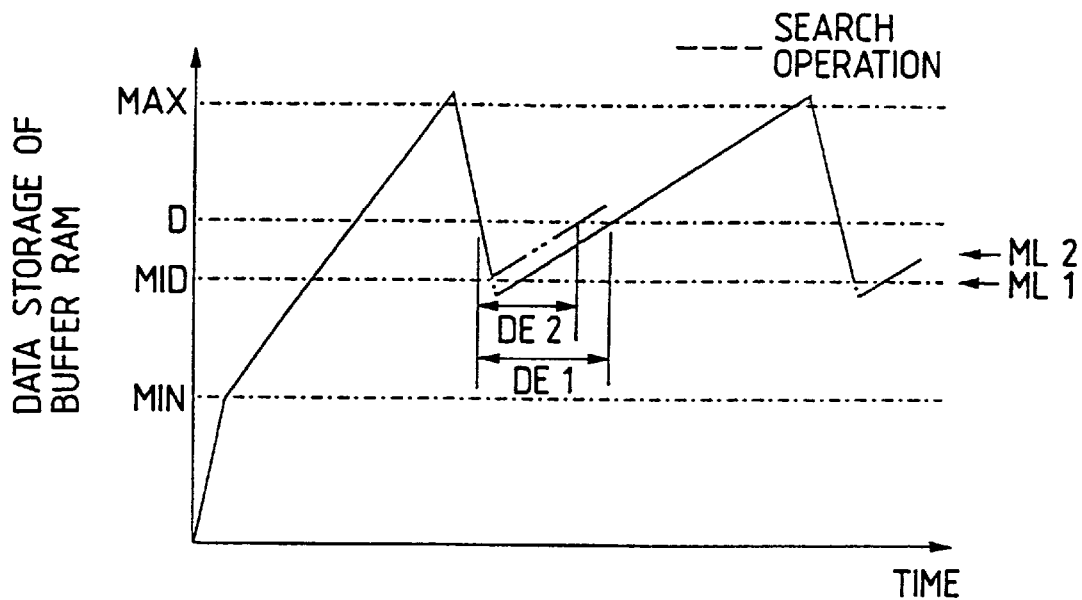
FIGS. 16(a) and 16(b) are graph which show cycles of variations in amount of data stored in a buffer RAM when a middle data storage level of the buffer RAM is changed according to a data transfer rate.

As discussed above, when the middle data storage level is much lower than the maximum data storage level and the changes (i.e., frequency) of the data readout operation being carried out are increased, that is, when a variation in the data storage of the buffer RAM 220 is low, the time the data storage take to reach a sufficient level is, as shown in FIG. 16(a), increased. This would result in an prolonged dangerous period DE1 during which the data storage of the buffer RAM 220 is lower than the D-level, causing a malfunction of the data reproduction system.

Figure 16B:
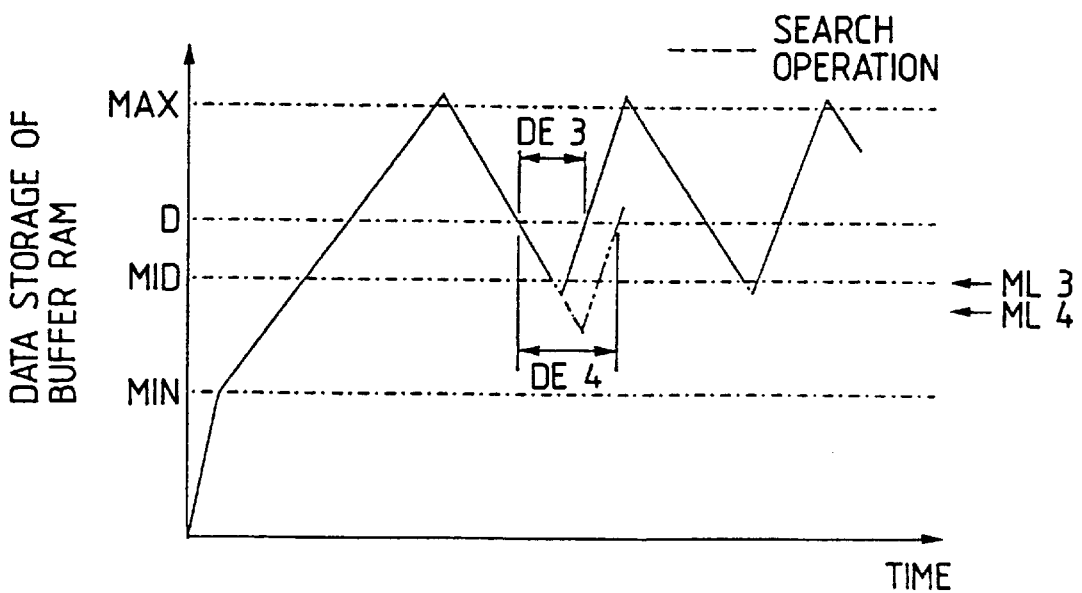

When the changes of the data readout operation being carried out are decreased, the reproduced data is stored in the buffer RAM 220 quickly, resulting in a shortened dangerous period DE3, as shown in FIG. 16(*b*), during which the data storage of the buffer RAM 220 is lower than the D-level.

This embodiment is aimed at overcoming the above problem.

Figure 17:
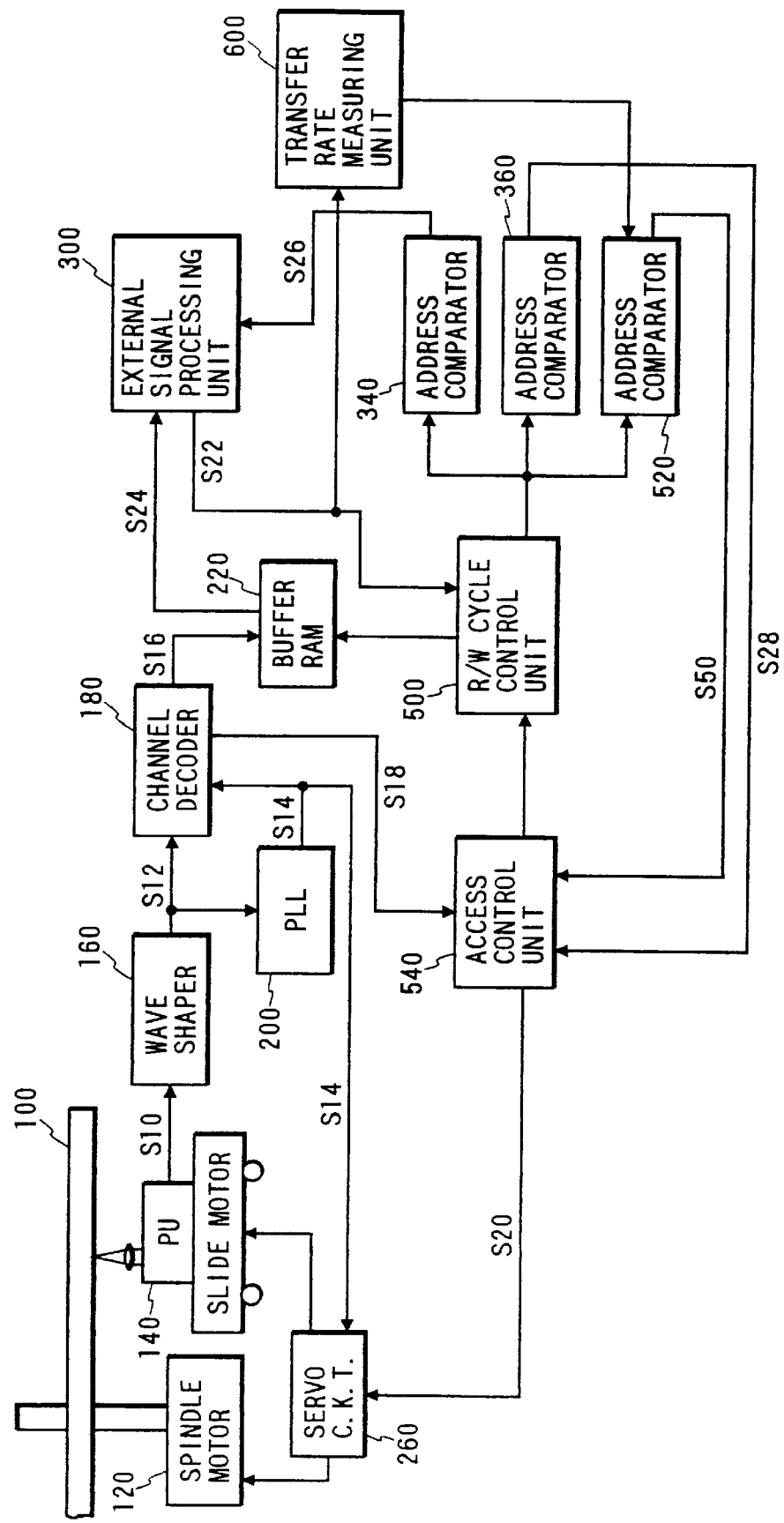
FIG. 17 is a block diagram which shows a variable transfer rate data reproduction system according to a fourth embodiment of the present invention.

FIG. 17 shows the data reproduction system according to the fourth embodiment which is different from the above third embodiment in that a transfer rate measuring unit 600 is added. Other arrangements are identical and explanation thereof in detail will be omitted here.

The transfer rate measuring unit 600 is designed to measure a readout transfer rate at which the reproduced data is read out of the buffer RAM 220, and changes the middle data storage level employed in the address comparator 520 according to the measured transfer rate.

Specifically, the transfer rate measuring unit 600 increases the middle data storage level when the readout transfer rate is higher than a preselected threshold value. Alternatively, when the readout transfer rate is lower than the preselected threshold value, the transfer rate measuring unit 600 decreases the middle data storage level. In either case, the middle data storage level is set lower than the D-level.

The measurement of the readout transfer rate in the buffer RAM 220 is accomplished by counting the request signal S22 supplied from the external signal processing unit 300 to the R/W cycle control unit 500 for a given time period using data readout clocks provided by the buffer RAM 220.

A basic operation of the data reproduction system of this embodiment is substantially identical with that of the above third embodiment and only a difference therebetween will be discussed below.

The address comparator 340 determines whether the data storage of the buffer RAM 220 exceeds the minimum data storage level or not. If it is concluded that the data storage is lower than the minimum data storage level, then the address comparator 340 outputs the readout inhibit signal S26 to the external signal processing unit 300. The external signal processing unit 300 then stops issuing the request signal S22.

The address comparator 360 determines whether the data storage of the buffer RAM 220 exceeds the maximum data storage level or not. If it is concluded that the data storage is higher than the maximum data storage level, then the address comparator 360 outputs the reproduction inhibit signal S28 to the access control unit 540. The access control unit 540 stores an address of a sector on the optical disc 100 whose recorded data is currently reproduced by the optical pickup 140, and inhibits the reproduction operation for a subsequent sector from being performed.

Upon readout of the reproduced data stored in the buffer RAM 220 by the external signal processing unit 300, the data storage is decreased and lowered, in time, below the middle data storage level, the address comparator 520 concludes that the data storage of the buffer RAM 220 is below the middle data storage level to provide the reproduction start signal S50 to the access control unit 540. The access control unit 540 is responsive to the reproduction start signal S50 to initiate the reproduction operation of the optical pickup 140. The optical pickup 140 is then shifted to a sector on the optical disc 100 following the last reproduced sector to reproduce recorded data thereon which, in turn, is stored in the buffer RAM 220. On demand, the reproduced data stored in the buffer RAM 220 is read out and transferred to the external signal processing unit 300.

During the above operation, the transfer rate measuring unit 600 monitors the data readout transfer rate of the buffer RAM 220, and elevates the middle data storage level employed in the address comparator 520 when the data readout transfer rate monitored is higher than the preselected threshold value. This allows the reproduced data to be stored, as shown in FIG. 16(*a*), in the buffer RAM 220 gradually.

As can be seen from the FIG. 16(*a*), the elevation of the middle data storage level causes the search operation to be sped up, so that the dangerous period DE1 is changed to a short dangerous period DE2.

Conversely, when the data readout transfer rate monitored is lower than the preselected threshold value, the middle data storage level employed in the address comparator 52 is lowered so that the reproduced data is, as can be seen from FIG. 16(*b*), stored in the buffer RAM 220 quickly. The lowering the middle dada storage level causes the search operation to be slowed down, so that the dangerous period DE is prolonged.

For example, when the middle data storage level, as shown in FIG. 16(*b*), is changed from ML3 to ML4, it will cause the dangerous period DE 3 to be changed to a long dangerous period DE4. A difference between the maximum data storage level and the middle data storage level however becomes great, thereby decreasing the chances of track jumps or searches being carried out which would impinge upon the mechanical parts of the data reproduction system.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A data reproduction apparatus comprising:

data reproducing means for reproducing data, which is recorded on a recording medium at a variable transfer rate, at intermittent cycles and providing a signal indicative thereof;

data storage means, responsive to the signal from said data reproducing means, for storing therein the data reproduced by said data reproducing means;

decoding means for decoding the data reproduced by said data reproducing means to provide a reproduction signal in sequence;

reproduction controlling means for controlling operations of said data storage means and said decoding means, said reproduction controlling means transferring the reproduced data stored in said data storage means to said decoding means so as to allow said decoding means to provide the reproduction signal in sequence; and data control signal outputting means for controlling output of the stored data from said data storage means and for outputting a data control signal to said data storage means;

wherein said reproduction control means selectively provides a reproduction enable signal and a reproduction inhibit signal to said data reproducing means according to the amount of the reproduced data stored in said data storage means to perform a data reproduction operation of said data reproducing means at the intermittent cycles, said data reproducing means having a reproduction element, said data reproducing means being responsive to the reproduction enable signal to have the reproduction element trace a data-recorded track provided on the recording medium to read recorded data therefrom and also responsive to the reproduction inhibit signal to stop the data reproduction operation thereof while allowing the reproduction element to trace a following portion of the data record track, when said reproduction control means provides the reproduction enable signal after providing the reproduction inhibit signal, said reproduction control means moving the reproduction element to a portion of the data record track immediately before a portion where the data reproduction operation has been stopped in response to the reproduction inhibit signal.

2. A data reproduction apparatus in accordance with claim 1, wherein said storage means is responsive to said data control signal by reading out the stored data therein.

3. A data reproduction apparatus comprising:

data reproducing means for reproducing data, which is recorded on a recording medium at a variable transfer rate, at intermittent cycles and providing a signal indicative thereof;

data storage means, responsive to the signal from said data reproducing means, for storing therein the data reproduced by said data reproducing means;

decoding means receiving from said data storage means the data stored therein for decoding the data reproduced by said data reproducing means to provide a reproduction signal in sequence;

reproduction controlling means for controlling operations of said data storage means and said decoding means, said reproduction controlling means transferring the reproduced data stored in said data storage means to said decoding means so as to allow said decoding means to provide the reproduction signal in sequence; and data control means for controlling an amount of stored data read out from said data storage means and for outputting a data control signal to said data storage means to control the amount of stored data read out therefrom;

wherein said reproduction control means selectively provides a reproduction enable signal and a reproduction inhibit signal to said data reproducing means according to the amount of the reproduced data stored in said data storage means to perform a data reproduction operation of said data reproducing means at the intermittent cycles, said data reproducing means having a reproduction element, said data reproducing means being responsive to the reproduction enable signal to have the reproduction element trace a data-recorded track provided on the recording medium to read recorded data therefrom and also responsive to the reproduction inhibit signal to stop the data reproduction operation thereof while allowing the reproduction element to trace a following portion of the data record track, when said reproduction control means provides the reproduction enable signal after providing the reproduction inhibit signal, said reproduction control means moving the reproduction element to a portion of the data record track immediately before a portion where the data reproduction operation has been stopped in response to the reproduction inhibit signal.

4. A data reproduction apparatus in accordance with claim 3, wherein said storage means is responsive to said data control signal by reading out the stored data therein.

5. A data reproduction apparatus comprising:

data reproducing means for reproducing data, which is recorded on a recording medium at a variable transfer rate, at intermittent cycles and providing a signal indicative thereof;

data storage means, responsive to the signal from said data reproducing means, for storing therein the data reproduced by said data reproducing means;

decoding means for decoding the data reproduced by said data reproducing means to provide a reproduction signal in sequence;

reproduction controlling means for controlling operations of said data storage means and said decoding means, said reproduction controlling means transferring the reproduced data stored in said data storage means to said decoding means so as to allow said decoding means to provide the reproduction signal in sequence; and data control signal outputting means for controlling output of the stored data from said data storage means and for outputting a data control signal to said data storage means;

wherein said reproduction controlling means controls a data reproduction operation of said data reproducing means so as to hold an amount of the reproduced data stored in said data storage means within a given range required for said decoding means to decode the reproduced data continuously; and wherein said reproduction control means selectively provides a reproduction enable signal and a reproduction inhibit signal to said data reproducing means according to the amount of the reproduced data stored in said data storage means to perform a data reproduction operation of said data reproducing means at the intermittent cycles so as to hold the amount of the reproduced data stored in said data storage means within the given range, said data reproducing means having a reproduction element tracing a spiral data-recorded track formed on the recording medium, said data reproducing means being responsive to the reproduction enable signal to have the reproduction element trace the data-recorded track from a first portion to a second portion and being responsive to the reproduction inhibit signal to stop the data reproduction operation thereof while allowing the reproduction element to trace a portion of the data-recorded track following the second portion, when said data reproducing means receives the reproduction enable signal following input of the reproduction inhibit signal, said reproduction control means displaces the reproduction element to a portion immediately before the second portion of the data-recorded track to resume the data reproduction operation.

6. A data reproduction apparatus in accordance with claims 5, wherein said storage means is responsive to said data control signal by reading out the stored data therein.

7. A data reproduction apparatus comprising:

data reproducing means for reproducing data, which is recorded on a recording medium at a variable transfer rate, at intermittent cycles and providing a signal indicative thereof;

data storage means, responsive to the signal from said data reproducing means, for storing therein the data reproduced by said data reproducing means;

decoding means receiving from said data storage means the data stored therein for decoding the data reproduced by said data reproducing means to provide a reproduction signal in sequence;

reproduction controlling means for controlling operations of said data storage means and said decoding means, said reproduction controlling means transferring the reproduced data stored in said data storage means to said decoding means so as to allow said decoding means to provide the reproduction signal in sequence; and data control means for controlling an amount of stored data read out from said data storage means and for outputting a data control signal to said data storage means to control the amount of stored data read out therefrom;

wherein said reproduction controlling means controls a data reproduction operation of said data reproducing means so as to hold an amount of the reproduced data stored in said data storage means within a given range required for said decoding means to decode the reproduced data continuously; and wherein said reproduction control means selectively provides a reproduction enable signal and a reproduction inhibit signal to said data reproducing means according to the amount of the reproduced data stored in said data storage means to perform a data reproduction operation of said data reproducing means at the intermittent cycles so as to hold the amount of the reproduced data stored in said data storage means within the given range, said data reproducing means having a reproduction element tracing a spiral data-recorded track formed on the recording medium, said data reproducing means being responsive to the reproduction enable signal to have the reproduction element trace the data-recorded track from a first portion to a second portion and being responsive to the reproduction inhibit signal to stop the data reproduction operation thereof while allowing the reproduction element to trace a portion of the data-recorded track following the second portion, when said data reproducing means receives the reproduction enable signal following input of the reproduction inhibit signal, said reproduction control means displaces the reproduction element to a portion immediately before the second portion of the data-recorded track to resume the data reproduction operation.

8. A data reproduction apparatus in accordance with claim 7, wherein said storage means is responsive to said data control signal by reading out the stored data therein.

* * * * *